United States Patent
McIntosh

(10) Patent No.: US 9,697,711 B2
(45) Date of Patent: Jul. 4, 2017

(54) SYSTEM AND METHOD FOR TAMPER DETECTION USING RFID DEVICES

(71) Applicant: The Boeing Company, Chicago, IL (US)

(72) Inventor: Darren C. McIntosh, Mukilteo, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/663,019

(22) Filed: Mar. 19, 2015

(65) Prior Publication Data
US 2016/0275769 A1    Sep. 22, 2016

(51) Int. Cl.
G08B 13/00 (2006.01)
G08B 13/24 (2006.01)
G08B 13/12 (2006.01)
G06K 19/077 (2006.01)

(52) U.S. Cl.
CPC ... *G08B 13/2451* (2013.01); *G06K 19/07749* (2013.01); *G06K 19/07798* (2013.01); *G08B 13/126* (2013.01); *G08B 13/2414* (2013.01)

(58) Field of Classification Search
CPC ............. G06K 19/073; G06K 19/0739; G06K 19/07749; G06K 19/0776; G08B 13/2437
USPC .............................................. 340/571–572.8
See application file for complete search history.

(56) References Cited

U.S. PATENT DOCUMENTS

| | | | | |
|---|---|---|---|---|
| 5,646,592 A * | 7/1997 | Tuttle | ............... | G06K 19/07798 340/541 |
| 5,831,531 A * | 11/1998 | Tuttle | ................... | G08B 13/126 340/540 |
| 5,884,425 A * | 3/1999 | Baldwin | ............... | G09F 3/0292 283/101 |
| 6,050,622 A * | 4/2000 | Gustafson | ................. | E06B 9/68 292/307 R |
| 6,259,369 B1 * | 7/2001 | Monico | ............ | G06K 19/07749 156/291 |
| 6,400,271 B1 * | 6/2002 | Davies, Jr. | ........... | G08B 13/242 340/572.1 |
| 6,407,665 B2 * | 6/2002 | Maloney | ................ | G06K 17/00 235/375 |

(Continued)

FOREIGN PATENT DOCUMENTS

WO    WO2006046157 A1    5/2006

OTHER PUBLICATIONS

European Patent Office; Extended European Search Report for European Patent Application No. 16152230.5; dated Aug. 12, 2016.

*Primary Examiner* — Hai Phan
*Assistant Examiner* — Son M Tang
(74) *Attorney, Agent, or Firm* — Parsons Behle & Latimer

(57) ABSTRACT

A system for tamper detection includes a security device and a data device. The security device has a first portion disposable on a first side of a separation boundary of a separable object, and a second portion disposable on a second side of the separation boundary. The security device further includes a first Radio Frequency Identification (RFID) circuit configured to provide a first return signal. The data device includes a microprocessor and system memory, an RFID reader and a radio antenna. The data device is configured to send and receive radio frequency signals with the first RFID circuit, and to recognize the first return signal as indicating an untampered condition of the separable object.

20 Claims, 10 Drawing Sheets

(56) References Cited

U.S. PATENT DOCUMENTS

| | | | |
|---|---|---|---|
| 6,421,013 B1* | 7/2002 | Chung | G06K 19/07749 235/441 |
| 6,824,320 B1* | 11/2004 | Kerr | G03B 17/26 242/348 |
| 6,888,509 B2* | 5/2005 | Atherton | G06K 19/073 235/492 |
| 7,034,689 B2* | 4/2006 | Teplitxky | B65D 55/06 340/572.1 |
| 7,102,522 B2* | 9/2006 | Kuhns | G06K 19/027 340/572.1 |
| 7,151,455 B2* | 12/2006 | Lindsay | G06K 19/0717 340/539.26 |
| 7,176,796 B2* | 2/2007 | Chen | B65D 55/028 215/901 |
| 7,183,913 B2* | 2/2007 | Hughes | B63C 9/22 340/539.15 |
| 7,382,262 B2* | 6/2008 | Commagnac | B65D 55/02 340/572.1 |
| 7,410,103 B2* | 8/2008 | Nagel | G06K 7/0008 235/440 |
| 7,460,015 B2* | 12/2008 | Forster | G06K 19/0717 340/10.5 |
| 7,712,674 B1* | 5/2010 | Warner | G06K 19/07749 235/487 |
| 7,812,726 B2* | 10/2010 | Barlow, Jr. | B65D 75/00 340/531 |
| 7,843,315 B2* | 11/2010 | Satoh | G06K 19/072 235/383 |
| 8,169,318 B2* | 5/2012 | Atherton | G06K 19/073 340/572.1 |
| 8,284,056 B2* | 10/2012 | McTigue | G06Q 10/087 340/10.1 |
| 9,070,068 B2* | 6/2015 | Coveley | G06K 19/07749 |
| 2002/0067264 A1* | 6/2002 | Soehnlen | B65D 5/42 340/572.1 |
| 2005/0242950 A1* | 11/2005 | Lindsay | G06K 19/0717 340/539.26 |
| 2005/0280512 A1* | 12/2005 | Forster | G06K 7/0008 340/10.34 |
| 2007/0152829 A1* | 7/2007 | Lindsay | G06K 19/0717 340/572.3 |
| 2007/0210173 A1* | 9/2007 | Nagel | G06K 7/0008 235/492 |
| 2007/0232164 A1 | 10/2007 | Swan et al. | |
| 2008/0100450 A1 | 5/2008 | Ayyagari et al. | |
| 2008/0238675 A1* | 10/2008 | Yang | B65D 55/028 340/572.1 |
| 2009/0102646 A1* | 4/2009 | Bara | G06K 19/073 340/540 |
| 2012/0235815 A1 | 9/2012 | Coveley et al. | |
| 2013/0306737 A1* | 11/2013 | Freeman | G06K 19/06037 235/488 |

* cited by examiner

SYSTEM AND METHOD FOR TAMPER DETECTION USING RFID DEVICES

FIELD OF THE DISCLOSURE

The present disclosure relates generally to devices for tamper detection. More particularly, the present disclosure relates to a system and method for tamper detection using RFID strips, sensors and the like.

BACKGROUND

There are a variety of situations in which devices for detecting tampering are useful. This can include situations in which potentially hazardous or valuable substances or items, such as pharmaceuticals, chemicals, petrochemicals, etc., are stored in a container of some sort. This can also include situations in which it is desirable, for reasons of safety or security, to know whether certain items or locations have been accessed or tampered with. One particular field in which the detection of tampering is desirable is in air transportation. In order to ensure that aircraft are safe, significant time and effort may be spent in security sweeps of airplanes prior to flight. For airplane operators, the cost of these routine security sweeps is quite high, and performing such sweeps can keep airplanes grounded for significant periods.

One facet of security sweeps is to detect tampering with or access to restricted items or locations. To facilitate detection of such tampering, tamper-evident strips or seals are often used, such as shown in FIGS. 1A and 1B. As shown, this fairly traditional tamper-evident strip 10 is a butterfly-shaped adhesive sticker, having a central breakable region 12. The strip 10 is affixed with the breakable region 12 overlying or bridging an opening boundary 14 of a container 16 or other item to be secured. The adhesive of the strip 10 is chosen so that the strip 10 cannot be easily removed, and any attempts to remove it are revealed by tampered regions 18, which show evidence that the strip 10 has been peeled or picked-at. Likewise, opening of the container 16 will separate the opposing portions of the container across the opening boundary 14, breaking the strip 10 along the breakable region 12, so that after opening the container 16 the strip 10 will have a broken edge 20. When the strip seal is broken along the broken edge 20, this indicates that the area has been compromised.

Traditional tamper-evident strips rely almost entirely on the knowledge and thoroughness of the inspector, and can be overlooked in bad light, or be mistakenly overlooked when the seal or strip is broken. Traditional tamper-evident strips also rely on the knowledge of the inspector to know where to look. Consequently, the most common types of tamper-evident adhesive strips are usually made as visible as possible, such as with bright colors and bold lettering and/or logos, which may not be aesthetically desirable in many situations.

Other types of tamper-evident strips (not shown) have words, such as VOID or STOP, that are printed repeatedly on the strip, and appear only after the strip has been fully or partially peeled off or peeled open. These types of tamper-evident seals may be an improvement over some traditional strips, but still rely on the knowledge and thoroughness of an inspector to ensure confirmation. They also may be considered aesthetically undesirable by many users and observers.

The present application relates to one or more of the above issues.

SUMMARY

It has been recognized that it would be desirable to have a tamper-evident device and system that can reduce the time and human labor involved in detecting tampering with certain secured items and locations.

It has also been recognized that it would be desirable to have a tamper-evident device and system that is inexpensive to implement and maintain.

It has also been recognized that it would be desirable to have a tamper-evident device and system that is easily applicable and economical for locations or items that are infrequently accessed, as well as those that are frequently accessed.

In accordance with one embodiment thereof, the present application discloses a system for tamper detection, including a security device and a data device. The security device has a first portion disposable on a first side of a separation boundary of a separable object, and a second portion disposable on a second side of the separation boundary. The security device further includes a first Radio Frequency Identification (RFID) circuit configured to provide a first return signal. The data device includes a microprocessor and system memory, an RFID reader, and a radio antenna. The data device is configured to send and receive radio frequency signals with the first RFID circuit, and to recognize the first return signal as indicating an untampered condition of the separable object.

In accordance with another embodiment thereof, the present application provides a Radio Frequency Identification (RFID) device, having a first portion and a second portion, coupled at a separation region that is configured to be disposed across a separation boundary of a separable object, and a first RFID circuit, configured to transmit a first signal. The first RFID circuit includes a circuit portion associated with both the first and second portions and extending across the separation region, separation of the first and second portions preventing transmission of the first signal. Transmission of the first signal indicates an untampered condition of the separable object.

In accordance with yet another embodiment thereof, the present application provides a method for facilitating inspection of a plurality of sealed objects. The method includes placing a Radio Frequency Identification (RFID) device across a separation boundary of a sealed object, configuring a data device to scan and receive a return signal from the RFID device that indicates a tampered condition of the sealed object, and providing, via the data device, an output indicting the tampered condition.

BRIEF DESCRIPTION OF THE DRAWINGS

FIG. 4 is a plan view diagram of an RFID tamper-evident strip after access and showing evidence of being tampered with.

Figure 1A:
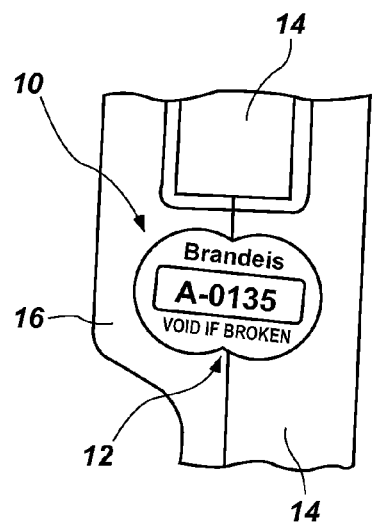
FIGS. 1A and 1B are views of a prior art tamper indicating strip before and after tampering.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the disclosure as defined by the appended claims.

DETAILED DESCRIPTION

As noted above, tamper-evident strips or seals are often used to help detect tampering with or access to restricted items or locations. However, various types of tamper-evident strips, seals and sensors that are currently known can be aesthetically undesirable, and generally rely upon the knowledge and thoroughness of an inspector to perform their intended function, which makes their use somewhat costly and affects their reliability.

Advantageously, as disclosed herein, a system and method has been developed that can increase accuracy while reducing the time and human labor involved in detecting tampering with certain secured items and locations. Further, this system and method is believed to be relatively inexpensive to implement and maintain, and to be easily applicable and economical for locations or items that are infrequently accessed, as well as those that are frequently accessed. This system incorporates RFID (Radio Frequency Identification) technology into tamper-evident strips and sensors. This type of system can be useful in a variety of applications, such as aircraft, military hardware, banking operations, hospitals, and chemical, petrochemical and pharmaceutical industries, to name just a few.

Figure 2:
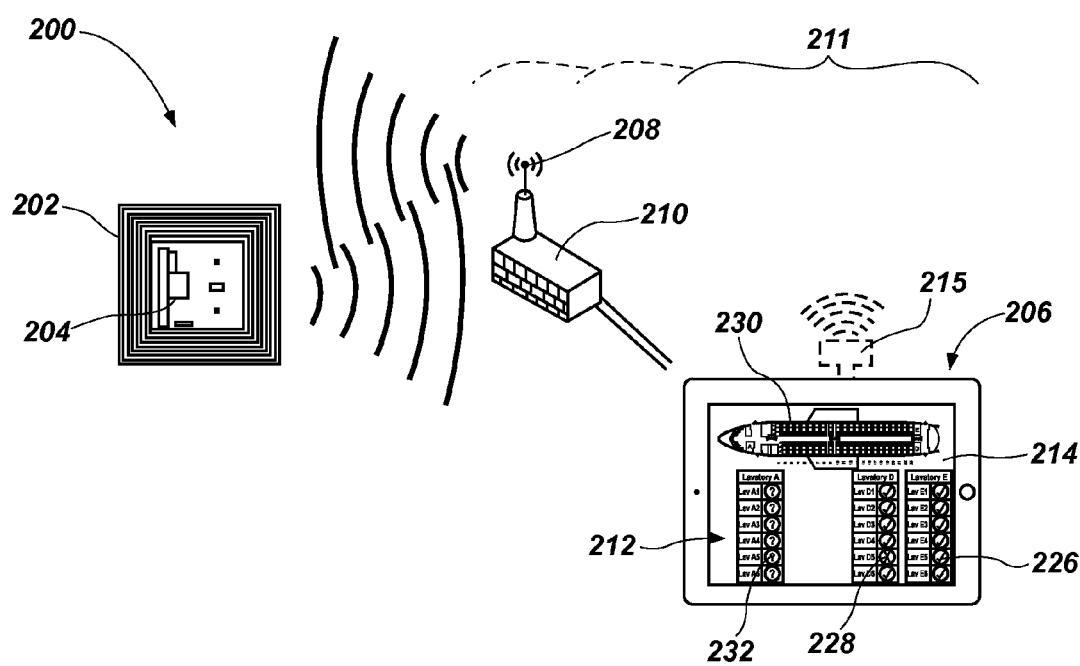
FIG. 2 is a schematic diagram of an embodiment of a tamper detection system using RFID devices, in accordance with the present disclosure.

Provided in FIG. 2 is a schematic diagram of an embodiment of a tamper detection system 200 using RFID devices, in accordance with the present disclosure. The system generally includes a plurality of RFID security devices 202, each including at least one RFID circuit 204, which are associated with (e.g. attached across) a separation boundary of a sealed object, such as the opening margin of a compartment of an aircraft (not shown in FIG. 2). As used herein, the term "separation boundary" is intended to refer to a margin or region at which an object or item can be opened or separated. The system 200 further includes a user interface 206, which interfaces with the security devices 202. The user interface 206 is used in conjunction with an antenna 208 and an RFID reader 210, which provides a transceiver for sending and receiving signals with the RFID devices 202. The user interface 206, antenna 208 and RFID reader 210 can together be referred to as a data device 211, whether they are physically combined together in a single device, or are separate elements that are used together. The term "data device" is thus used herein to encompass any user interface device 206, whether fixed or mobile, that is used in conjunction with a reader 210 and an antenna 208 to query and receive return signals from an RFID security device 202.

The data device 211 is configured to send and receive radio frequency signals with the RFID security devices 202, and to distinguish between a return signal from the security device 202 indicating a tampered condition of the associated separable object (not shown in FIG. 2), and a return signal from the security device 202 indicating an untampered condition of the separable object. The user interface 206 can include a display 212, which provides tamper-related information related to the security devices 202, and can also allow user input.

As depicted in FIG. 2, the user interface 206 can be a mobile device, such as a tablet computer 214 or the like, and includes a microprocessor and system memory and is provided with appropriate software. In one embodiment, an antenna 208 and reader 210 can be incorporated into a USB device 215 that attaches to the tablet computer 214, allowing a general use tablet computer 214 or the like, combined with the USB device 215, to include all components and perform all functions of the data device 211. Alternatively, the data device 211 can be a special purpose device (not shown) that includes the antenna 208, reader 210, and user interface 206 together. As another alternative, the user interface 206 (and possibly the reader 210 and an antenna 208) can be incorporated into a fixed data device, discussed in more detail below, which can be installed in a particular location, with one or more fixed or mobile antennas associated with it.

When the system 200 is in use, each RFID security device 202 associated with a separation boundary of a sealed object is scanned using the data device 211, and a return signal from each RFID security device 202 is received and stored by the data device 211. Scanning, detecting and collecting the signals from each of the RFID devices 202 generally involves querying each RFID device via the data device 211, and receiving the return signals in response. The return signal from each security device 202 indicates either a tampered or untampered condition of the respective RFID security device 202. The data device 211 collects the signals from multiple such RFID devices 202, and the user interface 206 provides an output indicting the tampered or untampered condition of each sealed object.

Figure 3:
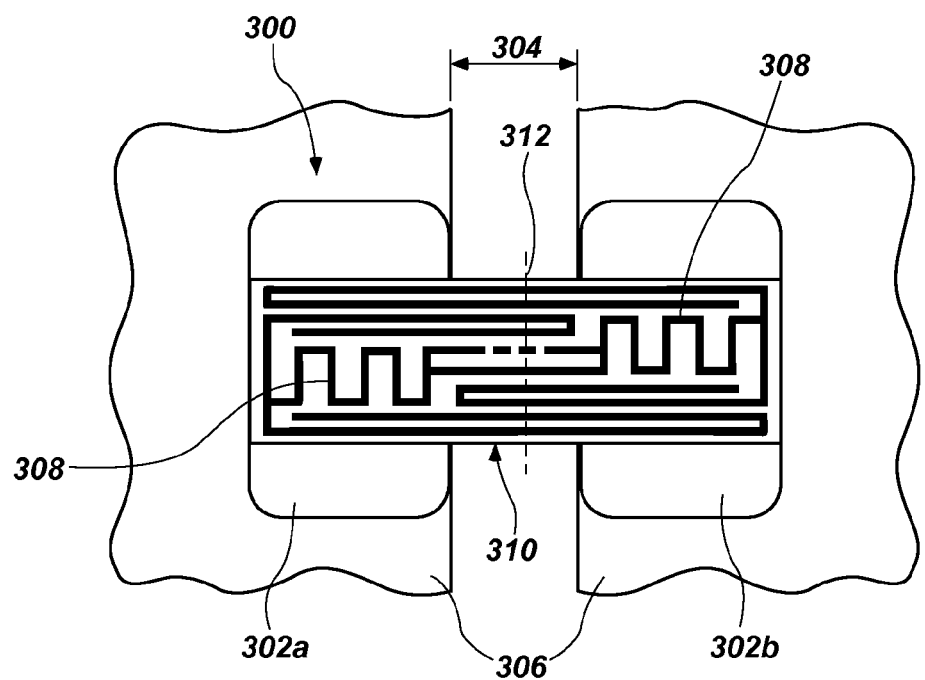
FIG. 3 is a plan view diagram of an RFID tamper-evident strip in its untampered condition.
Figure 4:
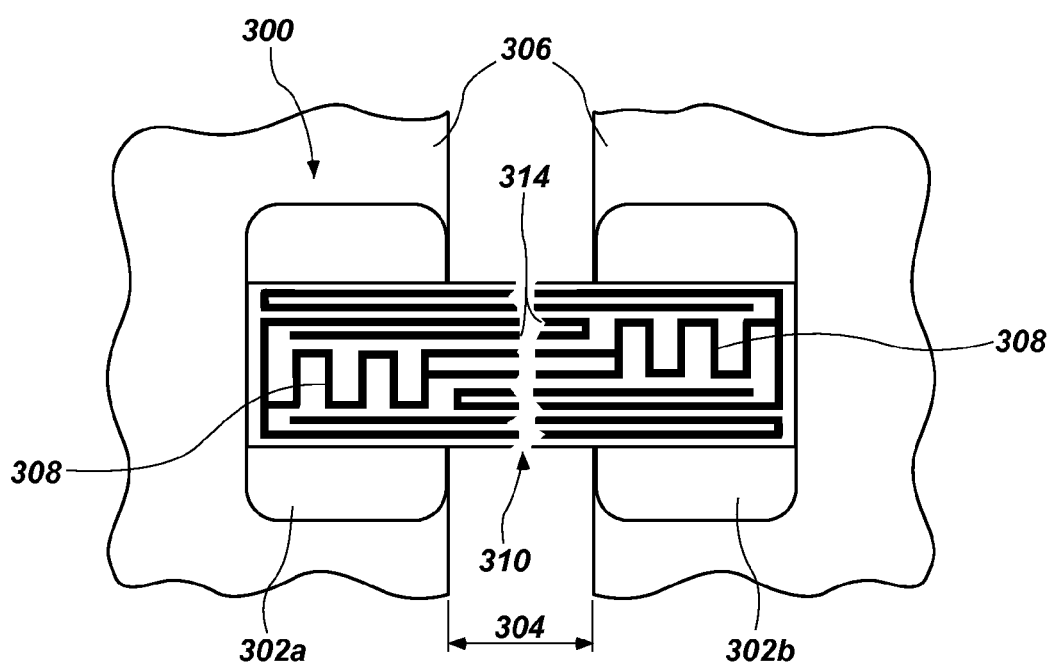

An RFID security device that can be used with the system of FIG. 2 can be configured in various ways. Referring to FIGS. 3 and 4, one embodiment of an RFID security device 300 in accordance with the present disclosure generally includes a first portion 302a disposable on a first side of a separation boundary 304 of a separable object 306, such as an openable compartment or other portion of an aircraft, and a second portion 302b disposable on a second side of the separation boundary 304. The RFID security device 300 includes an RFID circuit 308. As used herein, the term "separable object" is intended to include any object that includes portions that can be positioned or attached close together, and can be taken apart, whether temporarily or permanently. This can include items such as openable cabinets, hatches, storage cases, etc., whether fixed or moveable, and can include such items that are sealed, such as a sealed case, cabinet, hatch, etc. This term can also include other types of separable objects, such as a tearable sports ticket, a tearable boarding pass, a parking pass, a backstage pass or any other form of temporary access pass or any other security device where an indication of separation or past use is desirable.

In the particular embodiment shown in FIGS. 3 and 4, the RFID security device 300 is a self-adhesive, single-use, butterfly-shaped strip that contains the integrated circuit of the RFID device embedded in or otherwise affixed to the strip 300. The first portion or lobe 302a is configured to be adhesively attached on the first side of the separation boundary 304, and the second portion or lobe 302b is configured to be adhesively attached on the second side of the separation boundary 304.

Provided in FIG. 4 is a plan view diagram of an RFID tamper-evident strip 300 after access and showing evidence of being tampered with and broken. The central portion or separation region 310 of the strip 300 includes a weak breakaway tear line or breakable portion 312 that is configured to generally overlie or bridge the separation boundary 304. A portion of the RFID circuit 308 spans the breakable portion 312, so that when the separable object 306 is opened, the strip 300 will tear or rupture along break line 314 through the breakable portion 312 as shown in FIG. 4, thus severing a portion of the RFID circuit 308. The strip 300 is physically destroyed in this process, and at least a portion of the RFID circuit 308 is also broken, allowing radio detection of this condition via the data device 211 (shown in FIG. 2). When intact, the circuit 308 returns a SECURED signal to the data device 211. When broken, the circuit 308 returns a COMPROMISED signal to the data device 211, as described in more detail below.

The RFID circuit 308 can be passive, meaning that it does not include an internal power source, or it can be active, having an internal battery or other electrical power source. The mode of operation of both active and passive RFID's is well known to those of skill in the art. Passive RFID's are considered to be particularly desirable for this application because they require no battery and rely entirely on an RFID reader as their power source. That is, the RFID reader 210 (shown in FIG. 2) sends a signal with a query, and the RFID circuit 308 both receives the signal and draws electrical power from it. The RFID circuit 308 then sends a response to the query, using the electrical energy derived from the received signal to power the return transmission. The useful transmission range depends on both the power of the RFID reader 210 (shown in FIG. 2) and the configuration of the RFID circuit 308. Passive RFID circuits that can be read up to 20 feet (six meters) away are considered suitable for the present application, though combinations having different power and broadcast ranges can also be used. Advantageously, passive RFID circuits and devices have a relatively low production cost, and are simple and reliable.

Figure 1B:
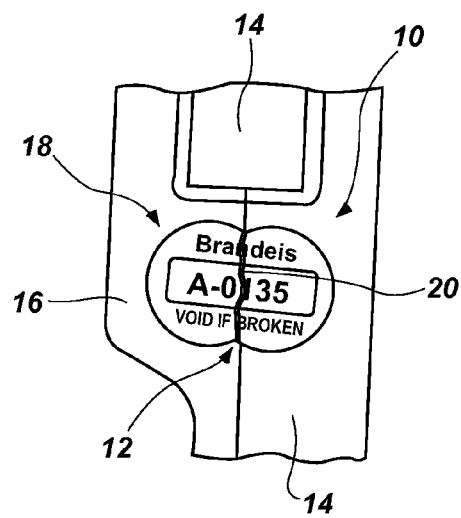

The view of FIG. 3 shows an intact RFID strip 300 overlying or bridging a separation boundary of a separable object 306, such as the interior edge of an access panel, lining or door of an aircraft interior or compartment. The RFID strip 300 of FIGS. 3 and 4 is considered particularly useful for items or locations that are subject to infrequent access. As noted above, when the compartment or other separable object 306 is opened, the breakable portion 312 of the RFID strip 300 is designed to break, thus severing a portion of the RFID circuit 308. The physical destruction of the strip 300 can also be visible in the same way that traditional tamper-evident strips show visible evidence of destruction and tampering—that is, the strip 300 will show visible evidence if broken, such as a visible tear or rip 314, and possibly also evidence of tampering if a person has picked at the strip or attempted to peel it off, similar to the evidence of tampering shown at 18 in FIG. 1B.

Advantageously, with the use of RFID devices, in which tamper detection does not rely solely on visible detection, the strip 300 can have a substantially transparent substrate, so that the underlying surface to which it is adhered shows through, thus reducing the visibility and aesthetic impact of the RFID security device 300. Where the strip 300 is transparent and the RFID circuit 308 includes metal (e.g. silver colored) conductors, only the conductors of the RFID circuit 308 will be readily visible in most applications, which can be very desirable. Alternatively, at least some portion of the RFID circuit 308 (e.g. the antenna portion) can be fabricated using transparent conductors disposed in or on the strip substrate, to further reduce the visual impact of the RFID security device 300. The views of FIGS. 3 and 4 are intended to show RFID strips 300 having a transparent substrate.

Figure 5:
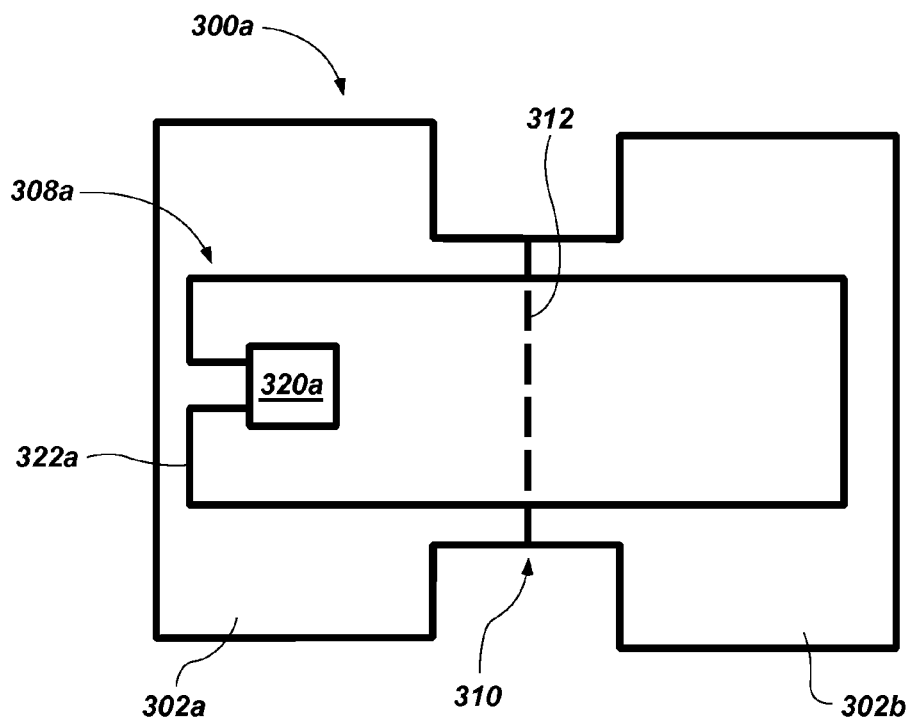
FIG. 5 is a schematic diagram of an RFID tamper-evident strip having a single RFID circuit.

It is to be understood that the tamper-evident RFID security devices disclosed herein, such as the strips 300 shown in FIGS. 3 and 4, can include one RFID circuit 308 or multiple RFID circuits 308. Shown in FIG. 5 is a schematic diagram of an RFID tamper-evident strip 300a having a single RFID circuit 308a. As described above, this strip generally includes a first portion 302a and a second portion 302b, coupled through a separation region 310 that is configured to be disposed across a separation boundary 304 of a separable object 306. The first and second portions 302a, b are opposing portions of a single-use adhesive strip 300, and the separation region 310 comprises a breakable portion 312 of the strip 300.

Advantageously, the strip 300 has a first RFID circuit 308a embedded in its substrate. The general features and components of passive RFID circuits are well known to those of skill in the art, and can be configured in a variety of ways. The first RFID circuit 308a generally includes an RFID processor unit 320a and an antenna portion 322a, which is connected to the RFID processor unit 320a. As will be appreciated by those of skill in the art, the RFID processor unit 320a typically includes a small, special purpose microprocessor and system memory, along with power-related circuitry for receiving and using transmitted power to perform microprocessor functions and send a return signal. When a signal is received by the antenna 322a, reception of the signal generates energy that is used by the RFID processor unit 320*a*. The data content of the received signal is acted upon by the RFID processor 320*a*, whether to store, retrieve or manipulate data stored in its memory, and a return signal is sent via the antenna 322*a*, using the energy from the received signal. One portion of the RFID circuit 308*a*, such as the antenna portion 322*a*, extends through or across the separation region 310. With this configuration, separation of the first and second parts 302*a, b* of the strip 300*a* severs the RFID circuit 308*a*, and prevents the RFID circuit 308*a* from receiving transmissions and returning a signal.

In the embodiment of FIG. 5, a return signal indicating a tampered condition of the RFID security device 300*a* is caused by severing of the RFID circuit 308*a* across the breakable portion 312. The RFID circuit 308*a* of FIG. 5 is thus essentially a binary device, which can provide one of two return signal interpretations. If the RFID device 300*a* returns a first signal when queried, this indicates that the RFID circuit 308*a* is intact, and thus the RFID security device 300*a* and the associated separable object 306 are SECURE. If no signal is returned, this indicates either that the RFID security device 300*a* has been COMPROMISED and the RFID circuit 308*a* has been broken, or that the particular RFID circuit 308*a* is out of range of the data device 211 (shown in FIG. 2), or that the RFID circuit 308*a* has malfunctioned.

Thus, return transmission of the first signal indicates an untampered condition of the separable object, and failure of transmission of the first signal indicates a tampered condition of the separable object, or that the RFID security device 300*a* is out of range or not functioning properly. This latter condition can prompt a user of the system to move closer to the particular RFID security device 300*a* to obtain a return signal. If no return signal is received when the RFID security device 300*a* and the data device (211 in FIG. 2) are believed to be in sufficiently close proximity, this indicates that the COMPROMISED indication is presumably correct, or that the RFID security device 300*a* has malfunctioned. In either of these latter situations, direct inspection and correction or replacement of the particular RFID security device 300*a* is indicated.

Figure 6:
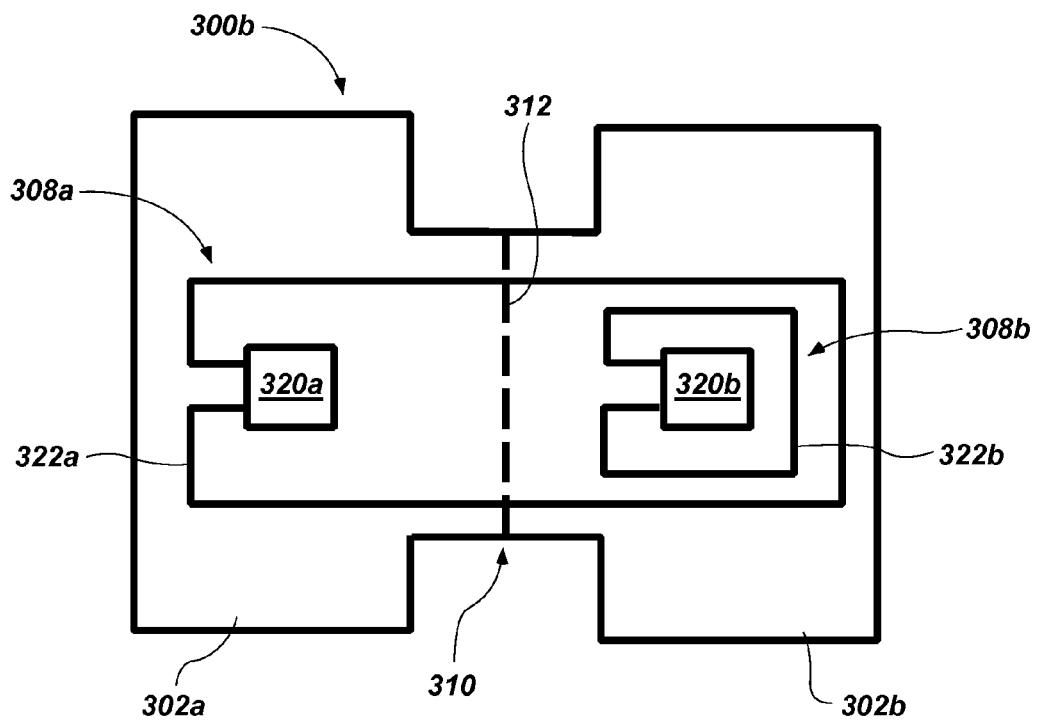
FIG. 6 is a schematic diagram of an RFID tamper-evident strip having a pair of RFID circuits.

Provided in FIG. 6 is a schematic diagram of an RFID tamper-evident strip 300*b* having a pair of RFID circuits 308*a, b* embedded in the strip substrate. The strip 300*b* generally includes a substrate having a first portion 302*a* and a second portion 302*b*, coupled across a breakable portion 312 in a separation region 310 that is configured to be disposed across a separation boundary 304 of a separable object 306. A pair of RFID circuits 308*a, b* are embedded in the strip 300*b*, including a first RFID circuit 308*a* that lies on both the first and second portions 302*a, b* of the strip 300*b*. This first RFID circuit 308*a* has its processor 320*a* disposed entirely on the first portion 302*a* of the strip, while a portion of the first RFID circuit 308*a*, in this case the antenna portion 322*a*, spans the breakable portion 312 of the RFID strip 300. The second RFID circuit 308*b* is disposed entirely on the second portion 302*b* of the RFID strip 300*b*.

As discussed above, these RFID circuits 308 can be passive or active, though the discussion herein specifically describes the application and use of passive RFID devices. Both RFID circuits 308*a, b* are generally configured like the RFID circuit 308*a* described above with respect to FIG. 5. Specifically, the first RFID circuit 308*a* includes an RFID processor unit 320*a* and an antenna portion 322*a*. The first processor 320*a* is disposed entirely on the first portion or lobe 302*a* of the RFID strip 300*b*, but the antenna portion 322*a* of the first RFID circuit 308*a* spans the breakable portion 312 of the RFID strip 300*b*, where it will lie across the separation boundary 304 of the separable object 306 when the strip 300*b* is in use. The second RFID circuit 308*b* also includes an RFID processor unit 320*b* and an antenna portion 322*b*, and is entirely contained upon the second portion or lobe 302*b* of the strip 300*b*. The first RFID circuit 308*a* is configured to transmit a first signal, and the second RFID circuit 308*b* is configured to transmit a second signal. Since a portion of only the first RFID circuit 308*a* spans the breakable portion 312, breakage of the strip 300*b* along the breakable portion 312 will sever only the first RFID circuit 308*a*, not the second.

Figures 7A, 7B:
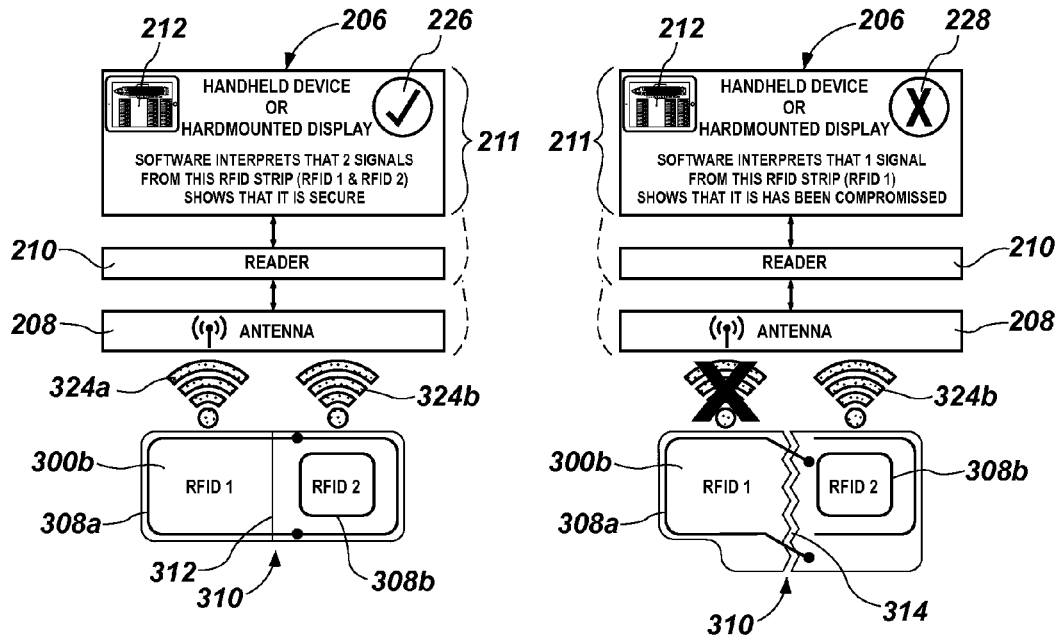
FIGS. 7A and 7B are block diagrams showing how the tamper detection system using RFID devices operates to show untampered and tampered conditions, in accordance with the present disclosure.

With the embodiment of FIG. 6, a signal indicating the untampered condition is dependent upon operation of both the first and second RFID circuits 308*a, b*. The general operation of the tamper detection system using RFID devices having two RFID circuits 308 is shown in the block diagrams of FIGS. 7A and 7B. These figures also show the type of indication that can be provided on the user interface 206 for different return signal conditions. When the two RFID circuits 308*a, b* are queried by the data device 211 and the RFID security device 300*b* is intact, both RFID circuits 308*a, b* will provide a return signal, indicated at 324*a, b*, respectively, in FIG. 7A. This signal is transmitted to the data device 211, which collectively includes the antenna 208, reader 210, and the user interface 206. Substantially simultaneous reception by the data device 211 of the first and second signals from the first and second RFID circuits 308*a, b* can be interpreted by the data device 211 to indicate the untampered or SECURE condition of the separable object (306 in FIGS. 3-4), and can be indicated by a green check 226 or other appropriate indicia on the display 212 of the user interface 206, as shown in FIG. 7A. On the other hand, when the RFID security device 300*b* is broken across the breakable portion 312, only one of the RFID circuits 308 (e.g. the second circuit 308*b*) will remain intact, and will be able to return a signal to the data device 211, indicated at 324*b* in FIG. 7B. Thus, reception of the second signal substantially simultaneously with no reception of the first signal indicates a tampered or COMPROMISED condition of the separable object 306, and can be indicated by a red "X" 228 or other appropriate indicia on the display 212 of the user interface 206, as shown in FIG. 7B. Finally, failure of reception of either the first and second signals (i.e. no return signal from both RFID circuits 308*a, b*) indicates that the RFID device 300*b* is presumably out of radio transmission range of the reader.

From this description it can be seen that one benefit of having multiple RFID circuits configured in this way is that the RFID security device provides return signals 324 that have more than just a binary on-off capability, and allow logical distinction between the COMPROMISED and out of range conditions. Since one of the RFID circuits 308 can return a signal 324 even when the RFID security device 300*b* is severed, the absence of any return signal 324 from the RFID security device 300*b* is interpreted to indicate that the security device is either out of radio transmission range or malfunctioning, but not COMPROMISED. In either case, movement of the reader to a different location where reception is more likely is the next logical step in use of the system. This configuration allows a user to be more certain of the COMPROMISED condition.

If no return signal is received when the RFID security device 300*b* and the data device 211 are believed to be in sufficiently close proximity, this indicates that the RFID security device 300*b* has malfunctioned in some way. In this latter situation, direct inspection and correction (e.g.

replacement) of the particular RFID security device 300*b* is indicated. In the case of RFID strips 300, like those shown in FIGS. 3 and 4, a broken, tampered, or malfunctioning RFID strip 300 is replaced with a new one when the COMPROMISED indication is received, or when a malfunction is determined.

Referring again to FIG. 2, the user of the data device 211 can quickly review the status of RFID security devices 202 that return a COMPROMISED signal or no signal at all, and investigate only the separable objects that appear to be compromised or malfunctioning. Advantageously, the data device 211 can be a mobile device, configured to send and receive signals from all RFID devices 202 within a transmission radius. The mobile data device 211 allows the user to view the display 212 while walking an airplane during inspection, allowing the user to quickly review the status of a large group of RFID security devices in one easy-to-read display 212. The computer system of the user interface 206 can be programmed to accumulate signals from all RFID security devices 202 as the user walks a path that is expected to receive signals from them. The accumulated return signals can be shown on the display 212, until the user receives a full slate of SECURE signals, at which point the user can provide input indicating completion of the sweep and acceptance of the results.

In an aircraft application, the display 212 can have a plan view diagram of the aircraft (230 in FIGS. 2 and 13-15) and easy-to-identify symbols. For example, a green check mark (226 in FIGS. 2, 7A, 13) can be provided on the display to indicate that a SECURE signal has been received from a given RFID security device 202, 300, and that no further action is required by the user or an inspector. A red "X" (228 in FIGS. 2, 7B, 13) can be used to indicate that a COMPROMISED signal has been received from a given RFID security device 202, 300, and that specific inspection of the location of that RFID security device 202, 300 is warranted. Finally, another symbol, such as an orange question mark (232 in FIGS. 2, 13), can be provided on the display to indicate that no signal has been received from a particular RFID security device 202. This can be interpreted to indicate that the user needs to move closer to the area being inspected, or that the particular RFID device 202 is not working.

Referring to FIGS. 2 and 5-7B, when a COMPROMISED or otherwise damaged, malfunctioning or tampered RFID security device 300 is detected, whether of the single RFID variety 300*a* shown in FIG. 5 or the multiple RFID circuit type strip 300*b* shown in FIG. 6, the compromised RFID strip 300 can be replaced with a new one. For security purposes, replacement of an RFID security device 300 can involve resetting a condition of the data device 211 at the time the new strip 300 is placed. Specifically, resetting the condition of the RFID security device 202 includes replacing the damaged or compromised RFID strip 300 with a new, single-use adhesive RFID security strip 300 across the separation boundary 304 of the sealed object 306, and resetting the data device 211.

At the time of replacement, the user scans the new RFID strip 300, and substantially simultaneously enters, for example, location identifying information for the strip 300, and other input to the data device 211 indicating the replacement. This resets the data device 211 to recognize the new RFID security strip 300, and to send and receive query signals from it. In this context, "substantially simultaneously" can mean some suitably short time period, such as within 30 seconds or less, depending on the conditions of the security device 300 (e.g. its location, type, etc.). This time limit can be programmed into the data device 211. Where the data device 211 is a mobile device, e.g. the tablet computer 214 of FIG. 2, and can be held by the user at the location of the new RFID security strip 300, this time limit can be shorter. Where the data device is a fixed device, as described in more detail below, this time limit can be longer, since after placing the new strip 300 some time interval is occupied by the user moving from the location of the strip 300 back to the fixed data device 211 and its display 212, to reset the data device 211. In an aircraft application, for example, the "substantially simultaneous" time interval for use with a fixed data device can be selected to accommodate the typical time involved in a user walking from one end to another of the respective aircraft. Following replacement of RFID security devices 300 and resetting of the data device 211, when all RFID security devices have finally been scanned and return a SECURE indication, a security sweep completion indication can be entered into the user interface 206 and transmitted from the data device 211 to the aircraft's flight computer or other system (not shown), as a precondition for operation of the aircraft.

Advantageously, the data device 211, whether fixed or mobile, can be password protected or include other security features, so that only authorized personnel can replace and reset the RFID security devices 300. As indicated above, the programming of the data device 211 can be configured to provide a variety of additional features, such as action time limits, etc., that further reduce the possibility that unauthorized persons can overcome the system.

Figures 8A, 8B:
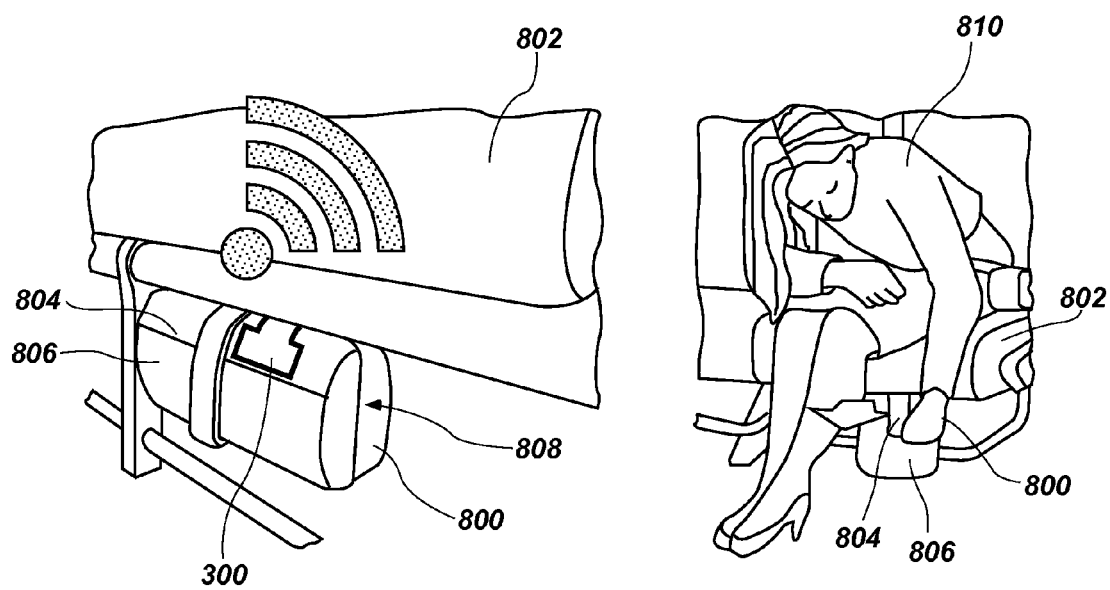
FIGS. 8A and 8B are perspective views of an aircraft life vest storage container associated with an aircraft seat, and a user removing the life vest from its container, respectively.

The tamper-evident strips 300 shown in FIGS. 3-6 can be used in a wide variety of applications. One application for the RFID tamper-evident strips 300 shown herein is to secure life vest storage containers associated with aircraft seats. Life vest tampering and theft has been identified as a major concern by airline operators. Replacing stolen life vests is costly, as is inspecting an aircraft before each flight to determine whether the life vests are all present and in good working order. Shown in FIG. 8A is a perspective view of an aircraft life vest storage container 800 associated with an aircraft seat 802. In this particular configuration, the life vest 804 is stored in the container 800 behind an openable lid 806. Advantageously, an RFID security strip 300 in accordance with this disclosure can be installed across the lid opening 808 of every life vest container or life vest bag/pouch 800, thereby tracking whether the particular life vest 804 has been tampered with or stolen. Specifically a tamper-evident RFID strip 300 like that shown in FIG. 3 can be placed over the opening 808 of the lid 806, and its status can be detected in the manner discussed above. So long as the RFID strip 300 provides a SECURE signal when queried, aircraft operators or maintenance personnel will know that a given life vest has not been tampered with, without individual visual inspection of each life vest container.

Shown in FIG. 8B is a view of a passenger 810 removing a life vest 804 from this container 800. After the life vest container 800 is opened (or if the RFID strip 300 malfunctions for some reason), any subsequent query of the RFID security device 300 will yield a COMPROMISED signal, indicating that the life vest 804 has been removed or tampered with, and that the associated RFID security strip 300 is to be replaced. The system disclosed herein thus streamlines the inspection process by increasing inspection efficiency and also helps to reduce theft, again dramatically reducing airplane operation costs.

Figure 9:
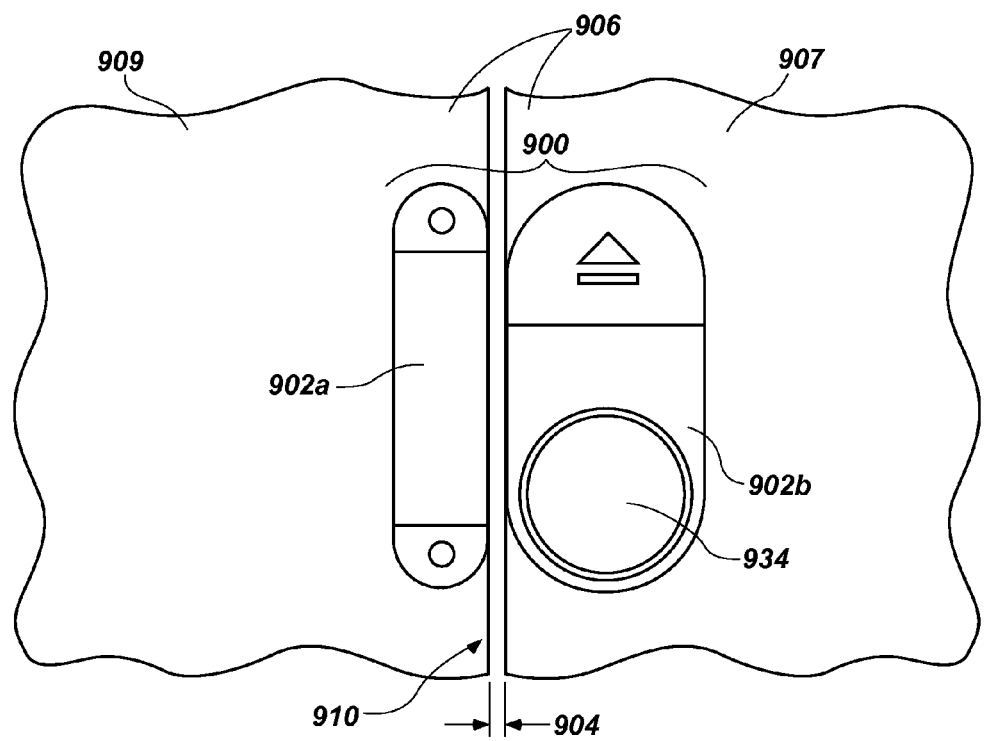
FIG. 9 is a plan view diagram of an RFID tamper-evident sensor associated with an openable compartment, with the compartment closed.
Figure 10:
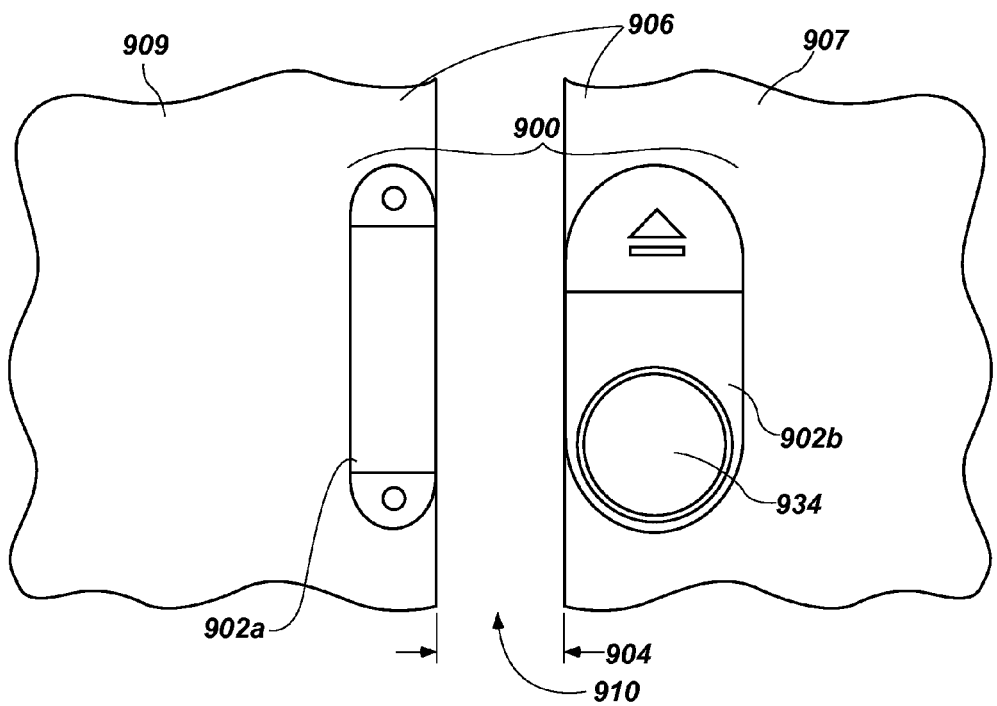
FIG. 10 is a plan view diagram of an RFID tamper-evident sensor associated with an openable compartment, with the compartment opened.

The tamper-evident strips 300 shown in FIGS. 3-6 may be used for applications where infrequent access is desired or expected. For frequent access applications, such as aircraft cabinets or compartments that are more frequently opened, but which are intended to be secured, RFID sensors in accordance with the present disclosure can be used. Provided in FIG. 9 is a close-up plan view diagram of an RFID tamper-evident sensor 900 associated with an openable compartment 906, with the compartment closed, and FIG. 10 is a view of the same with the compartment open.

Like the RFID strips 300 described above, the RFID security sensors 900 include opposing portions 902a, b that each include at least a portion of one or more RFID circuits 908. These sensors 900 are configured to be associated with an openable compartment door 907 or the like, and include a first portion 902a and a second portion 902b, coupled across a separation region 910 that corresponds to a separation boundary 904 of the separable object 906, the separation boundary 904 having a theoretical dividing line 912. These sensors 900 can be installed inside the compartment door(s) 907, so that the first and second portions 902a, b are not visible outside the compartment 906. In one example, the first portion 902a can be installed at a particular position on the inside of a door frame 909, and the second portion 902b can be installed on the inside of the corresponding door 907, adjacent to the position of the first portion 902a. As shown in FIGS. 9 and 10, one of the portions, such as the second portion 902b, can include a reset button 934, to be used in resetting the RFID security device 900, in the manner discussed below.

Figure 11:
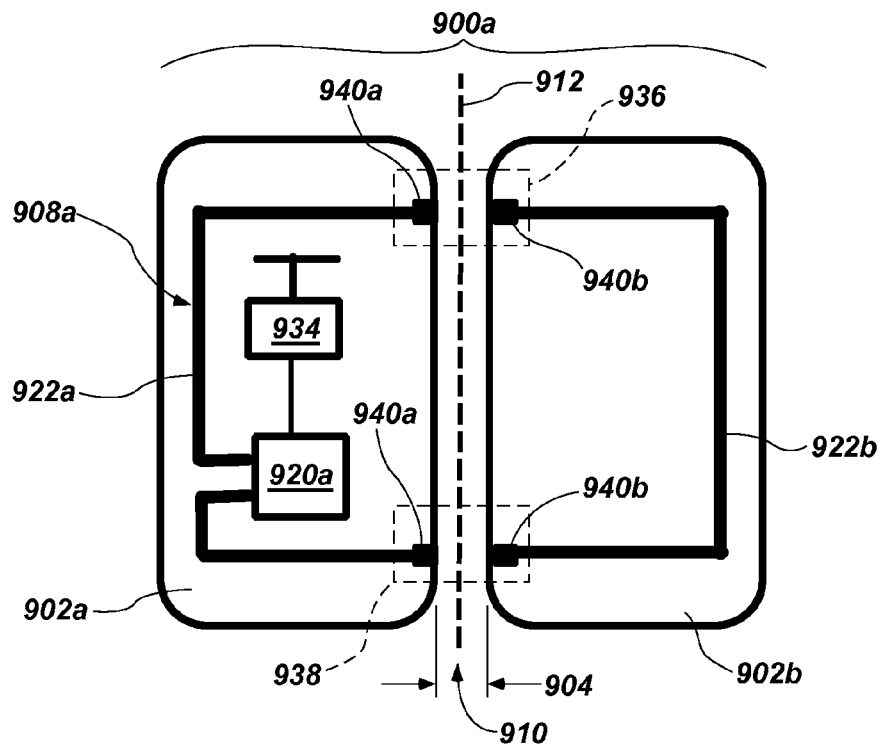
FIG. 11 is a schematic diagram of an RFID tamper-evident sensor having a single RFID circuit.

Like the RFID strips 300 described above, the RFID security sensors 900 can also include one RFID circuit (generally 908 in FIGS. 11, 12) or multiple RFID circuits. Shown in FIG. 11 is a schematic diagram of an embodiment of an RFID tamper-evident sensor 900a having a single RFID circuit 908a. As with the embodiments shown in FIGS. 3-6, this tamper-evident RFID sensor 900a is a multi-part RFID sensor, which generally includes a first portion 902a and a second portion 902b, disposed on the first and second sides of the separation boundary 904, respectively, of the separable object 906—in this case, the edge of a compartment door 907. The first and second portions 902a, b can be disposed in a location that is hidden from view of a user outside the separable object 906 when the object is in a closed condition, such as inside the compartment door 907, and are electrically coupled across the separation region 910 of the separation boundary 904. The single RFID circuit 908a includes an RFID processor unit 920a, and includes an antenna portion 922a that is electrically connected across the separation region 910 via a pair of selectively breakable electrical connections 936, 938 between the first and second portions 902a, b. The RFID circuit 908a can also include the reset button 934, which is electrically connected to the RFID processor unit 920a. The reset button 934 is one example of a variety of reset devices that can be associated with the sensor 900 and is configured to send a reset input or signal to the RFID circuit 908a when pressed, as discussed in more detail below.

The selectively breakable electrical connections 936, 938 can be non-contact electromagnetic proximity connections of portions of the RFID circuit 908a across the dividing line 912 in the separation region 910. For example, as shown in FIG. 11, the antenna portion 922a of the RFID circuit 908a includes two breaks at 936, 938. At each break the corresponding antenna circuit traces include a first electromagnetic proximity element 940a and a second electromagnetic proximity element 940b. Such proximity elements 940 are well known by those of skill in the art. For example, electromagnetic proximity elements that can be used with the sensors shown in FIGS. 9-12 include the magnetic sensor No. 59135-010 available from Hamlin, Inc. of Diss, Norfolk, United Kingdom, the 40FY36-33 proximity sensor available from Pepperl+Fuchs of Mannheim, Germany, and the GLS1, GLS-S1 and GLS-M1 magnetic proximity sensors available from Omron Industrial Automation of Kyoto, Japan. One of the two proximity elements 940a can include a coil, while the opposing element 940b at each gap 936, 938 includes a metal pad. When an electrical signal reaches the first end 940a of a break 936, 938, the coil in element 940a creates an electromagnetic field, which induces a current in the opposing metal pad in element 940b, thus transmitting the signal across the gap between the two elements. The electromagnetic field bridges the gap, thereby maintaining continuity of the circuit, just as in an intact RFID strip.

It is to be understood that both proximity elements 940a and 940 b can include coils. Additionally, those of skill in the art will recognize that other types of devices for the selectively breakable electrical connection can also be used, such as electrical contacts that physically connect when the compartment door 907 is closed, and break contact when the door 907 is opened.

When the door 907 is closed, as show in FIG. 9, the proximity elements 940 are close enough that a signal can be transmitted across the gap 904. The size or magnitude of the gap 904 that can be tolerated will depend on the particular proximity elements 940 that are used and the strength of the signal. However, it is anticipated that a suitable gap 904 for these types of devices to maintain an electrical connection is likely to be in the range of 0" (i.e. touching contact) to 0.25". When the door 907 is closed and the proximity elements 940 are within their range of electrical connection spacing, the RFID circuit 908a is complete, so that a SECURE signal can be returned to the data device 211 when the RFID device 900 is queried. However, when the door 907 has been opened, as shown in FIG. 10, the separation of the corresponding proximity elements 940 will exceed the maximum transmission gap 904 for the proximity elements 940, thus preventing transmission of a return signal. In this condition, no signal will be returned from the RFID circuit 908a, and a COMPROMISED condition will thus be recognized by the data device 211.

After a COMPROMISED condition is detected, the corresponding indication will be maintained on the user interface 206 until the compartment 907 is inspected, the sensor 900 and the user interface 206 (whether part of a mobile device or hard-mounted display) are reset and secured, as described below. Resetting of the RFID sensor 900a can be accomplished by pushing the reset button 934 or other reset device on the RFID sensor 900, and substantially simultaneously entering reset information into the user interface 206 by authorized personnel. As discussed above, in this context, "substantially simultaneously" can mean within 30 seconds or less, or some other brief time period that is suitable to the conditions of the sensors 900 and the data device 211. This time limit for resetting the data device can be programmed into the data device 211. Where the data device 211 is a mobile device, and can be held by the user at the location of the sensor 900, this time limit can be shorter. Where the data device 211 is a fixed device, as described below, this time limit can be longer, since after pressing the reset button some time interval is expected for the user to move back to the fixed data device and display, to reset the data device 211. In an aircraft application, for example, the selected reset time limitation for use with a fixed data device 211 can accommodate the typical time involved in a user walking from one end to another of the respective aircraft.

For an added layer of security, resetting the RFID circuit 908a can involve more than just pressing the reset button 934. That is, a variety of additional security features can be added in connection with the reset process, including a variety of different reset devices. For example, the sensor 900 can include a physical key lock or a key pad that accepts a password that is only known to authorized personnel. Alternatively, the sensor 900 can include a series of reset buttons that are to be pushed in a certain sequence, or the single reset button can be pressed some specific number of times, or in some combination of long and short duration presses, like a "Morse Code" approach. As another alternative, a small, inconspicuous button hole can be provided on or adjacent to the sensor 900, through which the sensor 900 can be reset using a specialized reset pin or small tool. As another alternative, a key card reader or memory card reader can be associated with the sensor 900, to read cards having a barcode, a magnetic strip, an embedded computer chip or some other information storage device. These cards can include smart cards, chip cards, SIM (Subscriber Identity Module) cards, ICC (Integrated Circuit Cards), smart keys, remote key fobs, proximity cards, Bluetooth devices, or other types of memory cards or devices to permit a reset. As yet another alternative, various forms of biometric recognition devices can be associated with the sensor 900, such as fingerprint, iris, handprint and voice recognition devices. Any of these additional security measures and reset devices can be used on their own or together, and can be associated with the sensor reset process, so as to provide a reset input for the sensor 900.

For security reasons, the RFID tamper detection system and method disclosed herein can be configured so that a reset can only happen at the sensor 900 and the data device 211 (whether a mobile device or a fixed display), not at the sensor 900 on its own. As noted above, the data device 211 can be password protected, so that only authorized users can check and reset sensors 900. The data device 211 can also include or be communicatively coupled to a historical database regarding resetting of sensors 900. This database can include a time log that is correlated with sensor location and user profiles of users who have performed an inspection/reset action, thus providing accountability verification.

Figure 12:
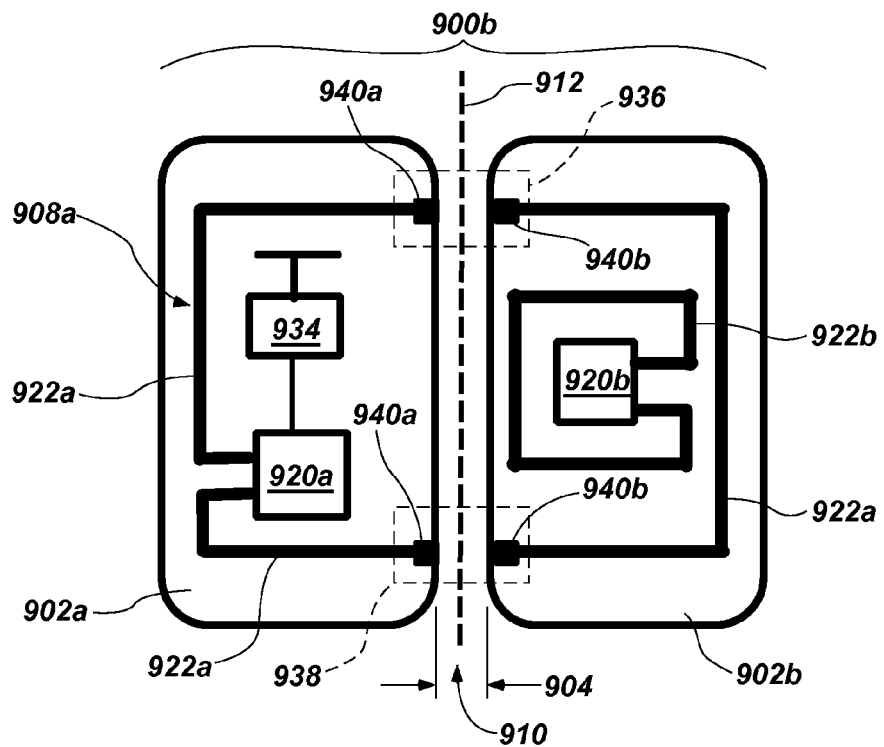
FIG. 12 is a schematic diagram of an RFID tamper-evident sensor having a pair of RFID circuits.

Shown in FIG. 12 is a schematic diagram of an RFID tamper-evident sensor 900b having a pair of RFID circuits 908a, b. Like the embodiment of FIG. 11, this tamper-evident RFID sensor 900b generally includes a first portion 902a and a second portion 902b, coupled across a separation region 910 that is disposed across the dividing line 912 at the separation boundary 904 of a separable object 906. As shown in FIG. 12, however, this device 900b includes a first RFID circuit 908a that spans both the first and second portions 902a, b, and a second RFID circuit 908b that is disposed entirely on the second portion 902b of the RFID sensor 900b. The processor 920a of the first RFID circuit 908a is disposed entirely on the first portion 902a, while a portion of the first RFID circuit 908a, in this case the antenna portion 922a, is electrically connected across the separation region 910 via a pair of selectively breakable electrical connections 936, 938 between the first and second portions 902a, b. The selectively breakable electrical connections 936, 938 can be configured with opposing proximity elements 940a, b on corresponding portions of the separated circuit elements, as discussed above with respect to FIG. 11.

As discussed above, the two RFID circuits 908a, b can be passive or active, though passive RFID devices are considered to have desirable characteristics for this application.

Both RFID circuits 908a, b are generally configured like the RFID circuit 908a described above with respect to FIG. 11. Specifically, the first RFID circuit 908a includes an RFID processor unit 920a and an antenna portion 922a, and is associated with both the first and second portions or lobes 902a, b of the RFID sensor 900b. The second RFID circuit 908b also includes an RFID processor unit 920b and an antenna portion 922b, and is associated solely with the second portion 902b of the sensor 900b. The first RFID circuit 908a is configured to transmit a first signal, and the second RFID circuit 908b is configured to transmit a second signal. However, a portion of only one of the two RFID circuits (e.g. the antenna portion 922a of the first RFID circuit 908a) spans the selectively breakable electrical connection 936, 938, where it will lie across the separation boundary 910 of the cabinet or other separable object 906 when the sensor 900b is in use.

With this configuration, opening of the cabinet 907 will sever a portion of only the first RFID circuit 908a, not the second circuit 908b, thus allowing only one of the RFID circuits 908 to return a signal when queried by the data device 211. The first RFID circuit 908a, which is breakable by opening the cabinet door 907, can include the reset button 934, which is electrically connected to the first RFID processor unit 920a, and is used for the reset function, described below.

The selectively breakable electrical connection for the sensor 900b can be created using non-contact electromagnetic proximity connection devices 940, as discussed above with respect to FIG. 11. When the door 907 is closed, as shows in FIG. 9, the proximity elements 940 are close enough that a signal can be transmitted across the gap 904, and a SECURE signal can be returned to the data device 211 when the RFID sensor 900b is queried. However, after the door 907 has been opened, as shown in FIG. 10, the separation of the corresponding proximity elements 940 will result in no signal being returned, and a COMPROMISED condition will be recognized by the data device 211 and displayed on the user interface 206. If no signal is received from either RFID circuit 908a, b, this can indicate that the RFID sensor 900b is out of transmission range, or that the sensor device as a whole is damaged or malfunctioning, as discussed above with respect to the RFID strip embodiments. When a COMPROMISED condition is determined, the associated compartment or object 906 can be inspected, and the sensor 900b and the data device 211 can be reset and secured.

Resetting of the sensor 900, whether the embodiment of FIG. 11 or 12, involves substantially simultaneously resetting a condition of the data device 211 and of the RFID sensor 900. Specifically, this can involve a user pressing the reset button 934 on the particular sensor 900 to reset the condition of the associated RFID circuit(s) 908, closing the door 907 of the associated compartment 906, and then substantially simultaneously providing a reset input to the data device 211, such as by entering a security code or other information into the user interface 206 to indicate that the compromised location has been inspected and is secured. As noted above, for added security, resetting the sensor 900 can involve more than merely pressing the reset button 934.

The RFID processor unit 920a can be programmed such that when the RFID circuit 908a has been broken (i.e. the door or compartment has been opened), merely pushing the reset button will not permit the circuit to be reclosed. Instead, the RFID processor unit 920a also needs a "handshake" or similar data exchange with the data device 211 after the data device has been reset. Once this has been done, a reset will then be permitted, allowing the circuit to be closed and a SECURE indication to be displayed on the user interface 206. This function helps to address the situation where a person gains entry to the door/compartment, then presses the reset button while the user interface 206 is out of range. The handshake is performed while the data device 211 is in broadcast proximity of the RFID sensor 900, so that it can detect the signal.

Figure 13:
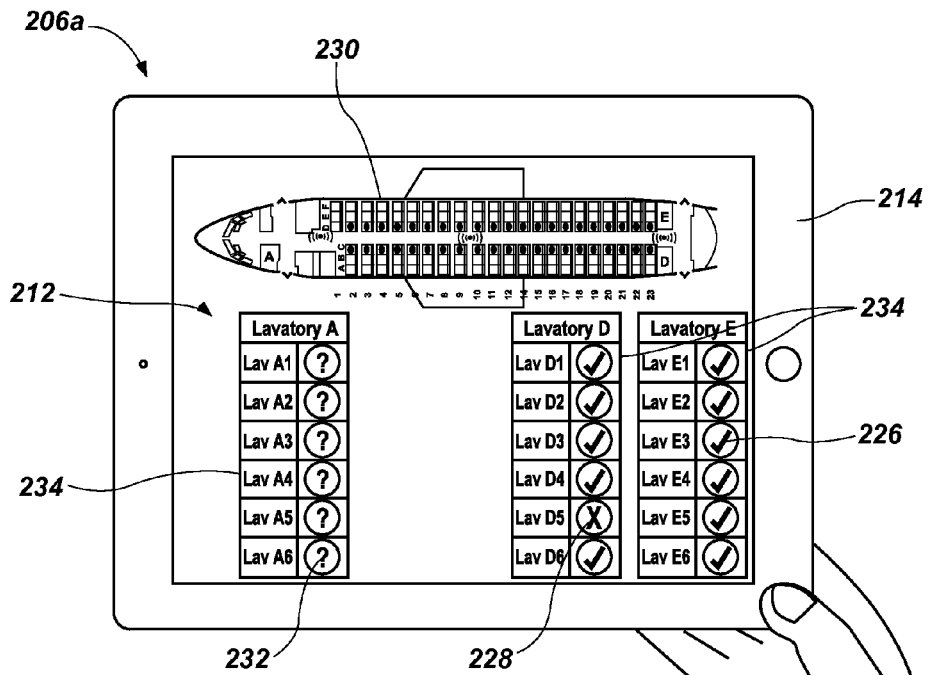
FIG. 13 is a plan view of a mobile device configured for querying RFID tamper-evident strips or sensors and receiving return signals from them, showing an embodiment of a user interface for the mobile device.

As noted above, the data device 211 can include a mobile device or a fixed device. Shown in FIG. 13 is a plan view of a mobile user interface device 206*a*, in this case a tablet computer 214, configured for querying RFID tamper-evident strips 300 or sensors 900 and receiving return signals from them. This figure shows one embodiment of a user interface display 212 for the mobile device 214 for use in an aircraft application. This display 212 includes a plan view diagram of an aircraft 230, showing specific indications of the security status of items (e.g. life vest compartments) associated with the aircraft seats, and additional tables 234 showing security status of other items or locations, such as storage compartments or aircraft lavatory locations. Advantageously, a user can carry this handheld device 214 through an aircraft in a broadcast mode, such that the mobile device 214 sends out signals addressed to all RFID security devices (202 in FIG. 2) in that aircraft, and thereafter receives security return signals from all of the RFID security devices as the user passes in sufficient proximity to them. The user can then specifically investigate and inspect the locations of any RFID security devices that return a COMPROMISED signal, without having to inspect every RFID security tag location.

Figure 14:
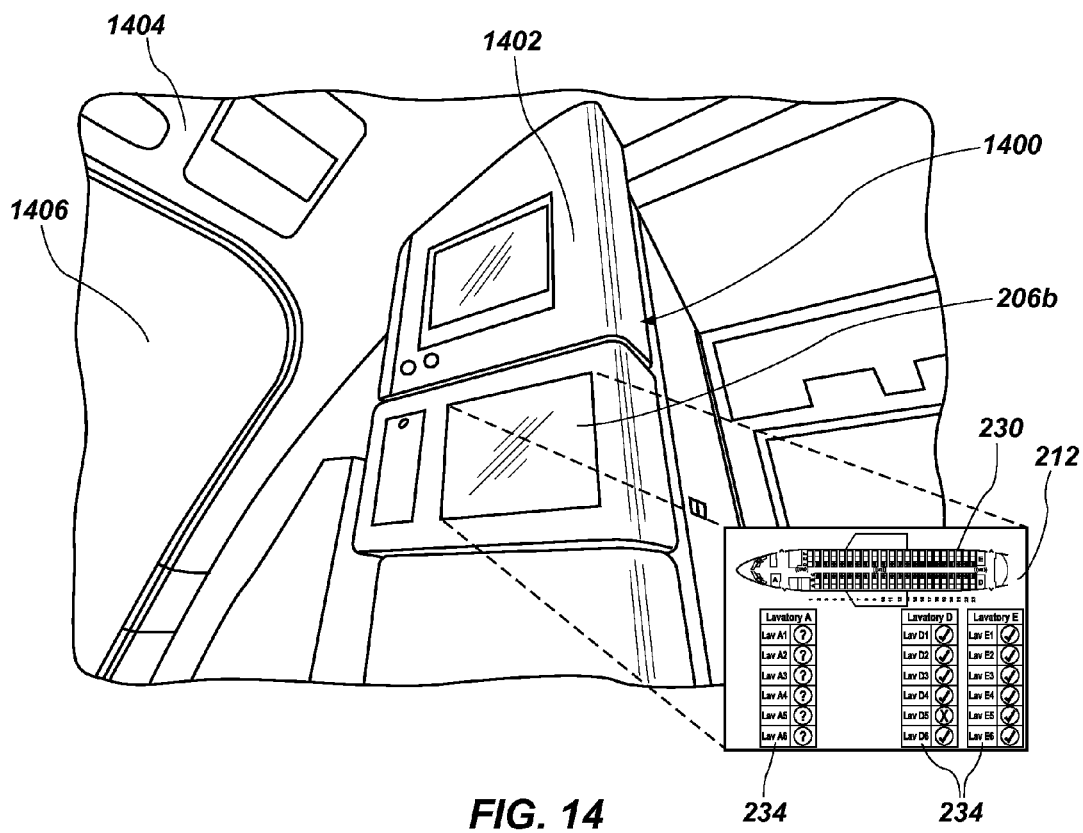
FIG. 14 is a perspective view of a hard-mounted display and control system for an aircraft having a RFID tamper detection system in accordance with the present disclosure.
Figure 15:
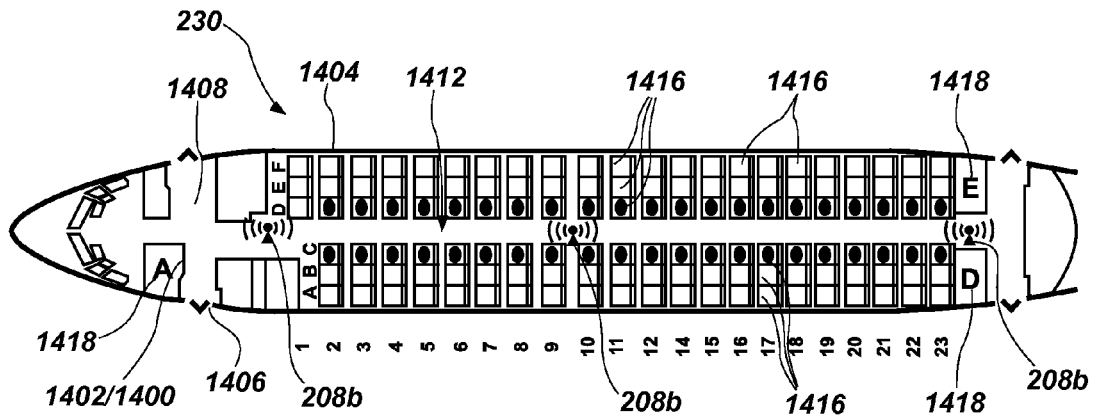
FIG. 15 is a plan view diagram of a cabin of an aircraft having an RFID tamper detection system in accordance with the present disclosure, incorporating a hard-mounted display and control system with multiple fixed antennae.

As an alternative to the mobile device of FIG. 13, shown in FIG. 14 is a fixed data device 1400 for use in an aircraft having an RFID tamper detection system in accordance with the present disclosure. A plan view diagram 230 of the cabin of an aircraft 1404 having an RFID tamper detection system in accordance with the present disclosure is shown in FIG. 15. In this aircraft application, the fixed data device 1400 is affixed (i.e. hard-mounted) to an interior pylon 1402 in a crew area of the aircraft 1404, such as near an entry door 1406 or galley area 1408 (shown in FIG. 15) of the aircraft 1404. As shown in FIG. 15, multiple fixed antennae 208*b* are located throughout the main cabin 1412 of the aircraft 1404. These are electrically coupled to the fixed data device 1400, and feed data to it.

The plurality of antennae 208*b* are electrically connected to the transceiver of the fixed data device 1400, each antenna being disposed in a fixed location with respect to a plurality of the RFID security devices. Each antenna 208*b* sends and receives signals with at least a subset of the plurality of security devices, so that all such devices are covered and movement of the data device 1400 is not needed. In an alternative embodiment, the fixed antennae 208*b* shown in FIG. 15 can be components of a Wi-Fi system on the aircraft 1404. Similarly, in other applications (i.e. in addition to aircraft) an RFID tamper detection system in accordance with the present disclosure can utilize Wi-Fi or other radio frequency transmission systems that are already part of an installation location. The data device 1400 is thus a fixed computing device with a transceiver, and is disposed in a fixed location with respect to the antennae 208*b*, and can provide the user with information regarding the condition of all of the RFID security devices in the aircraft. A similar fixed data device can be used for other applications of the system and method disclosed herein. For example, in a banking application, a data device can be wall-mounted, with multiple antennae located throughout a bank building, providing security feedback from multiple RFID security devices.

As shown in FIG. 14, the data device 1400 includes a user interface 206*b* with a display 212, which can include an aircraft cabin plan view 230, and tables 234 for displaying the condition of various tamper-evident RFID security devices throughout the aircraft, as discussed above. A larger view of the aircraft cabin plan view 230 is shown in FIG. 15. This view can include specific indications for RFID tamper-evident devices associated with each seat 1416 of the aircraft 1404 (e.g. the passenger life vest containers) in a user-friendly, graphical interface that is easy to interpret. In this display, the condition of each passenger life vest container for each seat 1416 is indicated by a specific color of fill for the seat icon. Where the passenger life vest container is secure, the respective seat can appear a particular color, such as blue or green. Where a passenger life vest container has been tampered with, the seat symbol can be displayed red or some other alerting color. A similar system of iconography can be used in the aircraft cabin image 230 for aircraft lavatories 1418 and/or other openable compartments, etc.

Whether the data device 211 for the RFID tamper detection system disclosed herein uses a mobile data device 214 or a fixed data device 1400, the data device incorporates, or is at least coupled to, a transceiver, and is configured to send and receive radio frequency signals with the RFID security devices (202 in FIG. 2). The data device is programmed to distinguish between a return signal indicating a COMPROMISED or tampered condition of the separable object, and a return signal indicating a SECURE or untampered condition of the separable object. Each COMPROMISED signal will persist on the user interface 206 of the data device 211 until a reset operation is performed, either by replacing an RFID adhesive strip (300 in FIGS. 3-6) or by resetting an RFID sensor (900 in FIGS. 9-12). Using this system, a user can quickly review the status of multiple strips and/or sensors, and investigate only the areas compromised, without having to physically inspect the location of each security device.

Figure 16:
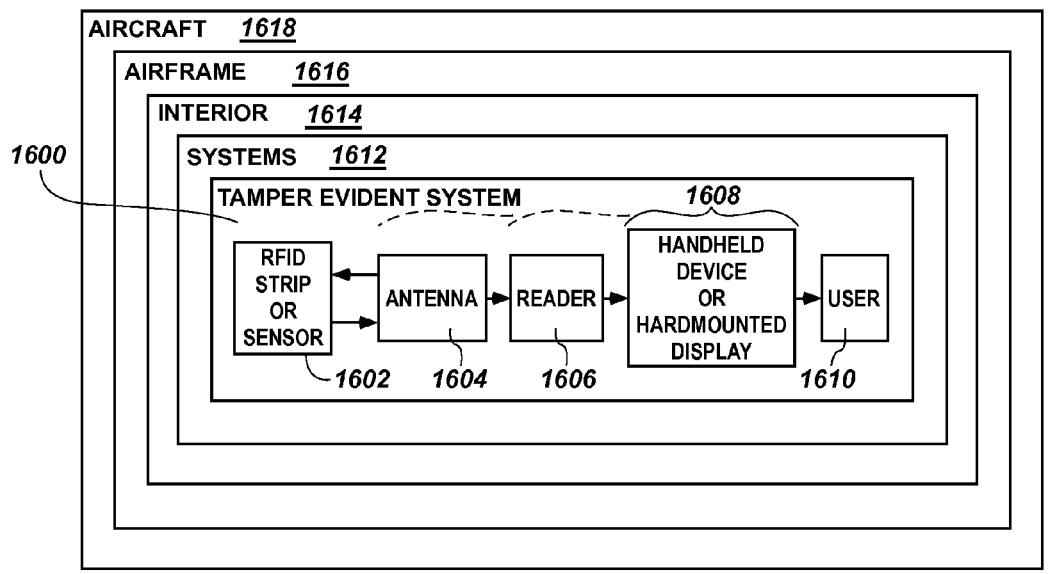
FIG. 16 is a block diagram of an embodiment of a tamper detection system using RFID devices, in accordance with the present disclosure.

In an aircraft application, a tamper detection system using RFID devices in accordance with the present disclosure can be conceptually viewed as shown in the block diagram of FIG. 16. The tamper evident system 1600 generally includes one or more RFID strips (i.e. strips) or sensors 1602, which send and receive signals with an antenna 1604 that is associated with an RFID reader 1606. The RFID reader 1606, in turn, is coupled with a user interface 1608, which can be a handheld (i.e. mobile) device or a fixed device, and provides an interface for the user 1610. The user interface 1608, the reader 1606 and the antenna 1604 can be collectively considered to comprise a data device, and can be incorporated into a single physical unit, or provided as separate elements of a combined system. Alternatively, the user interface 1608, which includes the related computer processor and system memory and is programmed for the functions disclosed herein, by itself or in conjunction with only one or the other of the reader 1606 and antenna 1604, can be considered to make up the data device.

The tamper evident system 1600 is part of the aircraft systems 1612 that are included in the aircraft interior 1614, which is disposed within the airframe 1616 of the aircraft 1618. Alternatively, an RFID tamper-evident system in accordance with the present disclosure can also be used in connection with systems beyond aircraft interiors, such as cargo doors or areas within cargo compartments and hatches on an aircraft exterior, etc. This type of tamper-evident system can be used on any part of an aircraft that is closeable and is routinely inspected.

Figure 17:
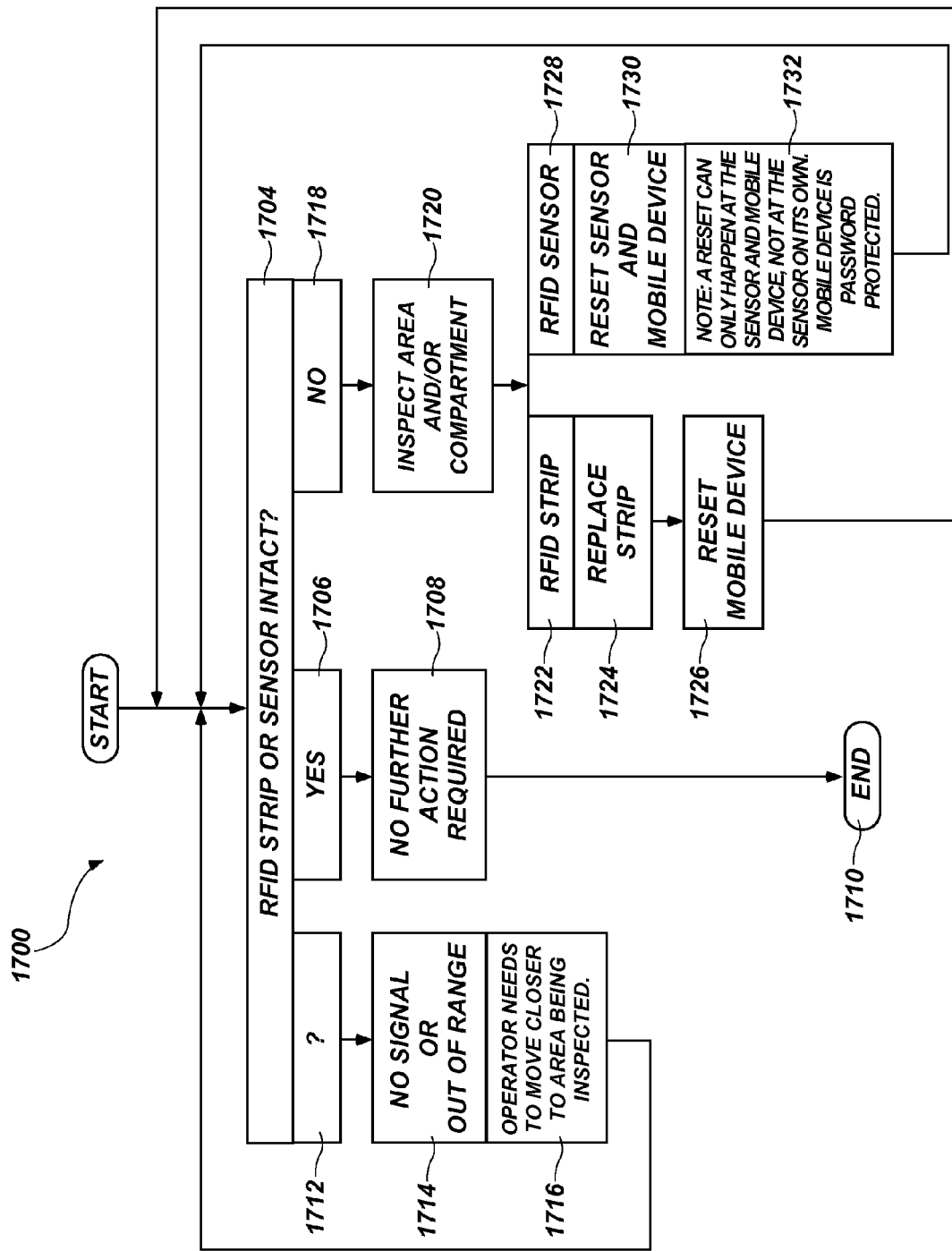
FIG. 17 is a flowchart showing the steps of operation in an embodiment of a tamper detection system using RFID devices having more than one RFID circuit, in accordance with the present disclosure.

A flowchart 1700 showing the steps of operation in an embodiment of a tamper detection method using RFID devices having more than one RFID circuit in accordance with the present disclosure is provided in FIG. 17. At the start of the process, the user first queries 1704 all RFID strips or sensors within range of the RFID data device or its associated antennae. Where the data device is associated with a hard-mounted display and control device, the system will presumably send query signals via all of the associated antennae to all associated RFID devices, and receive all return signals that come from these devices. Where the RFID data device is a mobile device, querying the RFID security devices can involve sending query signals out to all possible RFIDs, and receiving return signals from those that are within broadcast range as the user moves with respect to the various RFID security devices.

For simplicity in this process, each RFID circuit can have a unique digital address, so that each RFID only recognizes and responds to signals that carry the right address. This allows the data device, whether mobile or fixed, to query a plurality of RFID devices in series, so that the multiple return signals are not all received simultaneously, but are received one after the other. The digital address of each RFID security device can correspond with the actual physical location of the RFID security device. Each RFID strip and sensor can have its digital address printed upon it. With the RFID sensors, the digital address can be printed on the back of the sensor device. For RFID strips, while the strip can be substantially transparent, each strip can include an identification number inconspicuously printed on the strip, which corresponds to the digital address of its RFID circuit(s). When a given strip (or sensor) is replaced, the identification number can be input to the data device 211, along with location identifying information, so that the new digital address can be used for querying the RFID security device.

After the initial query signal (block 1704) is sent, all RFID devices from which a SECURED return signal is received (block 1706) are recognized as having their RFID security device intact, and this condition can be represented by a green check mark or "Yes" indication (226 in FIG. 13) on the user display. For these RFID devices, no further action is indicated (block 1708), and the process ends (block 1710).

For RFID devices from which no return signal is received (block 1712), this is interpreted to indicate that the particular RFID device is out of range or malfunctioning (block 1714), and the system can provide an orange question mark (232 in FIG. 13) or other suitable symbol on the user display. Where a mobile data device (214 in FIGS. 2, 13) is being used, the presumptive action for the user to take in response to the NO SIGNAL result is to move (block 1716) closer to the area being inspected, and send a query signal again, returning to block 1704. If the NO SIGNAL response is still received after moving to any or all locations where a signal should be received from the particular RFID device and sending repeated queries, this indicates that the RFID device is malfunctioning, and should be repaired or replaced. For a fixed reader and display device (1400 in FIG. 14), a NO SIGNAL response presumably indicates that the RFID device is malfunctioning, and should be repaired or replaced.

For RFID devices from which a COMPROMISED return signal (block 1718) is received, this is interpreted to indicate that the compartment or area of the particular RFID device should be inspected (block 1720), and the system can provide a red "X" or other suitable symbol (228 in FIG. 13) on the user display. In this situation, after inspecting the compartment or location, if the RFID security device in question is an adhesive strip-type device (block 1722), the user can replace the strip (block 1724) and reset the data device (block 1726) in the manner outlined above, whether the data device is a mobile device or a fixed device with fixed antennae, returning to block 1704 to repeat the query process. If the RFID security device that returned the COMPROMISED signal is a sensor-type device (block 1728), the user resets both the sensor (i.e. using the reset button) and the data device (block 1730) in the manner outlined above, after inspecting the compartment or location. As noted above, resetting a sensor and its associated data device is a process that involves substantially simultaneously pushing the reset button on the sensor and entering a code into the data device (block 1732), whether the data device is a mobile device or a fixed device. Following the reset, the user returns to the first query step (block 1704) and queries all RFID devices again to verify that all are now indicating a SECURE condition. This query step (block 1704) can be repeated until the SECURE condition (block 1706) is returned for all RFID security devices.

Figure 18:
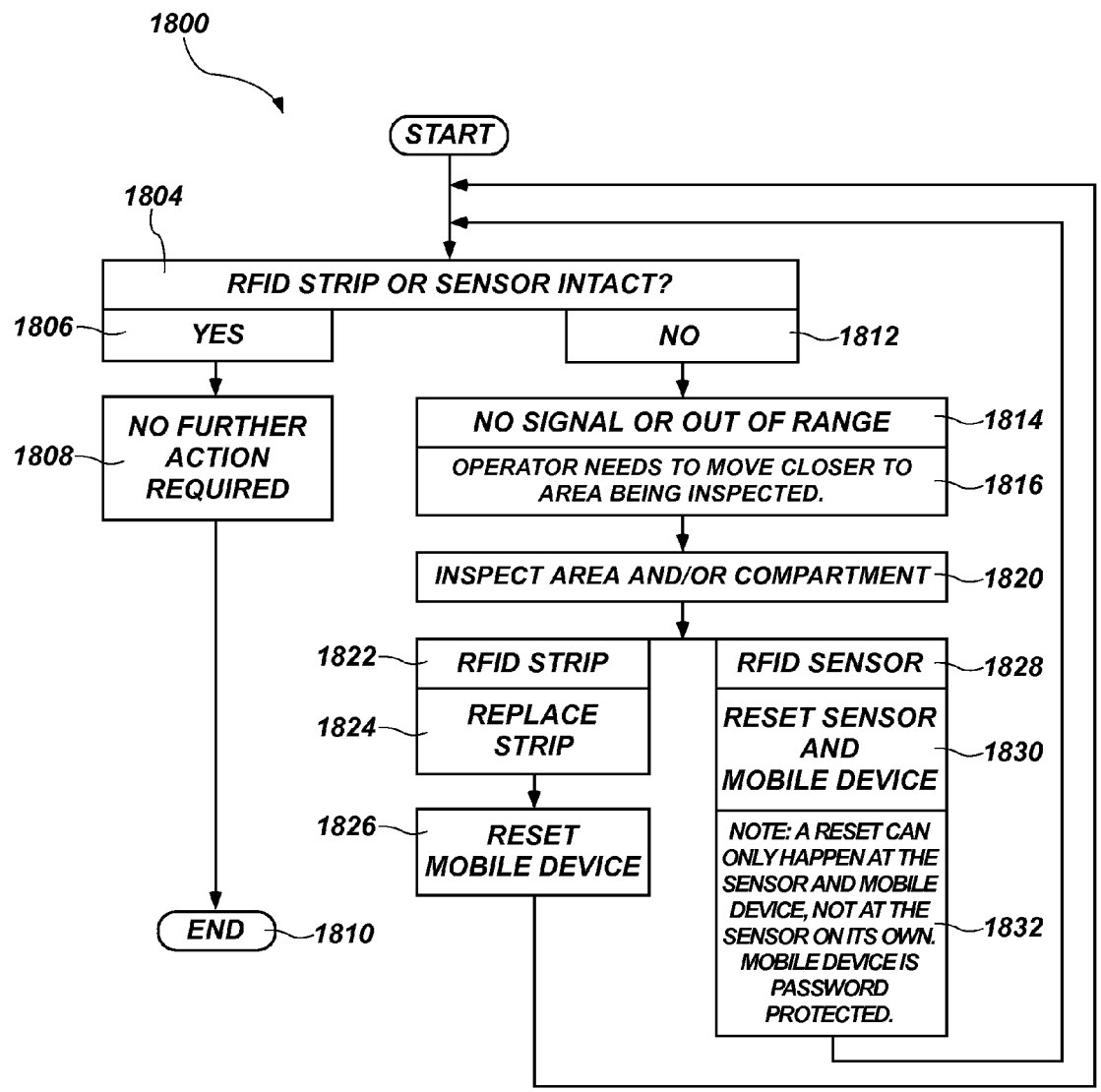
FIG. 18 is a flowchart showing the steps of operation in an embodiment of a tamper detection system using RFID devices having a single RFID circuit, in accordance with the present disclosure.

A flowchart 1800 showing the steps of operation in an embodiment of a tamper detection method using RFID devices having a single RFID circuit in accordance with the present disclosure is provided in FIG. 18. At the start of the process, the user first queries all RFID strips or sensors (block 1804) within range of the RFID data device or its associated antennae in the manner discussed above with respect to FIG. 17. As discussed above, each RFID circuit can have a unique digital address, so that each RFID only recognizes and responds to signals that carry the right address.

After the initial query signal (block 1804) is sent, all RFID devices from which a SECURED return signal is received (block 1806) are recognized as having their RFID security device intact, and this condition can be represented by a green check mark or "Yes" indication (226 in FIG. 13) on the user display. For these RFID devices, no further action is indicated (block 1808), and the process ends (block 1810).

For RFID devices from which no return signal is received (block 1812), this is interpreted to indicate either that the particular RFID device is out of range or malfunctioning, or has been COMPROMISED (block 1814), and the system can provide an orange question mark (232 in FIG. 13) or red "X" (228 in FIG. 13) or other suitable symbol on the user display. Where a mobile data device (214 in FIGS. 2, 13) is being used, the first presumptive action for the user to take in response to the NO SIGNAL result is to move (block 1816) closer to the area being inspected, and send a query signal again, returning to block 1804.

If the NO SIGNAL response is still received after moving to any or all locations where a signal should be received from the particular RFID device and sending repeated queries, the area or compartment should then be directly inspected (block 1820). In this situation, after inspecting the compartment or location, if the RFID security device in question is an adhesive strip-type device (block 1822), the user can replace the strip (block 1824) and reset the data device (block 1826) in the manner outlined above, whether the data device is a mobile device or a fixed device with fixed antennae, returning to block 1804 to repeat the query process. If the RFID security device that returned the no signal is a sensor-type device (block 1828), the user resets both the sensor (e.g. using the reset button) and the data device (block 1830) in the manner outlined above, after inspecting the compartment or location. As noted above, resetting a sensor and its associated data device is a process that involves substantially simultaneously pushing the reset button on the sensor and entering a code into the data device (block 1832), whether the data device is a mobile device or a fixed device. Following the reset, the user returns to the first query step (block 1804) and queries all RFID devices again to verify that all are now indicating a SECURE condition. This query step (block 1804) can be repeated until the SECURE condition (block 1806) is returned for all RFID security devices.

The system and method disclosed herein thus provides a way to provide relatively inexpensive tamper-proof sealing of secured places and objects, without relying solely on the knowledge and thoroughness of an inspector. It provides a method for inexpensive sealing of secured sectors using an intentionally destructible RFID tag that indicates status. Under this system, more efficient inspection of secured sectors is allowed since further inspection of a secured location or object is only needed if a COMPROMISED signal is received. In collecting either SECURED or COMPROMISED signals from the sensors, the system provides clear indication of improper entry to secured sectors and provides better data collection of access to these secured sectors. This system thus streamlines and reduces the time involved in inspection, and can reduce errors. For aircraft applications, this can help improve security and safety on aircraft, while also reducing costs. For example, since this system does not involve an inspector visually inspecting each tamper-evident strip or sensor, it can greatly reduce the time that airplanes are grounded for security sweeps, thus saving airplane operators significant costs.

This system and method also reduces the visibility and aesthetic impact of tamper-evident strips and the like. The system and method disclosed herein is also easy to use, identifying any compromised area(s) in one easy-to-read display, which addresses a serious concern from airplane operators. Finally, this sort of system and method can be applied on any aircraft, either as original equipment, or as a retrofit system, and can be put into practice by aircraft manufacturers and their suppliers, such as interior monument manufacturers.

It is to be appreciated that the system and method disclosed herein can be used in a variety of fields. Although an aircraft is given as an example of an aerospace application for the present disclosure, it is to be understood that this is only one example of an aerospace application. Additionally, while an aerospace example is shown, the principles of the disclosure may be applied to other industries, including any field where security of items or locations is desirable. For example, as discussed above, the system and method for tamper detection disclosed herein can be applied to items such as openable cabinets, hatches, storage cases, etc., whether fixed or moveable, and items that are sealed. It can also be applied to tearable sports tickets, tearable boarding passes, parking passes, backstage passes and any other form of temporary access pass or any other device where an indication of separation or past use is desirable. For example, an aircraft boarding pass that uses this technology can send a first signal when the boarding pass is whole, indicating that the associated passenger has not yet boarded. Upon the passenger's entry onto the vehicle, however, the boarding pass is torn, and the RFID security device changes to transmit a second signal that shows that the passenger has boarded. A similar process can be used for sports tickets. For use with a temporary access pass or the like, in a secure environment, when the pass is intact it sends a first signal. When the person exits the secure location, the pass can be torn by security personnel, and thereafter can send only a second signal, making its reuse impossible. This same configuration could work in multiple applications, such as parking passes, backstage passes, etc.

The system and method disclosed herein can be readily used in a variety of industries, such as the military (e.g. to secure weapons, ammunition or sensitive equipment), the banking industry (e.g. to secure currency containers, safe deposit boxes, etc.), pharmaceutical and chemical industries (e.g. to secure drugs or harmful chemicals), hospitals (e.g. to secure medicines and high value medical supplies), manufacturing operations (e.g. to secure tools and the like), and the petrochemicals industry, to name just a few. For example, most motor fuel pumps have a tamper-evident sticker across the front panel of the pump unit, surrounding the credit card reader, in order to deter tampering with credit card mechanisms and credit card skimming. Many other applications are also possible.

Although various embodiments have been shown and described, the present disclosure is not so limited and will be understood to include all such modifications and variations as would be apparent to one skilled in the art.

What is claimed is:

1. A system for status indication, comprising:
a security device, having a first portion disposable on a first side of a separation boundary of a separable object, a second portion disposable on a second side of the separation boundary, and a separation region between the first portion and the second portion, the security device further having a first radio frequency identification (RFID) circuit configured to provide a first return signal and a second RFID circuit configured to provide a second return signal, wherein the first RFID circuit includes a first processor disposed entirely on the first portion and a first antenna spanning the separation region, and wherein the second RFID circuit includes a second processor disposed entirely on the second portion and a second antenna disposed entirely on the second portion; and
a data device, comprising a microprocessor and system memory, an RFID reader and a radio antenna, configured to send and receive radio frequency signals with the first RFID circuit and the second RFID circuit, and configured to provide a graphical indication to a user of a secured status in response to receiving the first return signal with the second return signal, provide a graphical indication to a user of a compromised status in response to receiving the second return signal without the first return signal, and provide a graphical indication to a user of a no signal status in response to receiving neither the first return signal nor the second return signal.

2. The system of claim 1, wherein the first RFID circuit is a passive RFID circuit.

3. The system of claim 1, wherein the separable object is an openable portion of an aircraft.

4. The system of claim 1, wherein the security device comprises a single-use adhesive strip with the first RFID circuit embedded therein.

5. The system of claim 4, wherein the single-use adhesive strip comprises a substrate that is transparent.

6. The system of claim 1, wherein the security device further comprises:

a selectively breakable electrical connection between the first processor and the first antenna, the first return signal being possible only when the selectively breakable electrical connection is connected.

7. The system of claim 6, wherein the first processor and the first antenna are disposable upon the separable object in an interior location thereof.

8. The system of claim 6, further comprising a reset device configured to receive a reset input to reset the first RFID circuit.

9. The system of claim 1, wherein the data device is configured to recognize simultaneous reception of both the first and second return signal as indicating an untampered condition, and reception of only the second return signal as indicating a tampered condition of the separable object.

10. The system of claim 1, wherein the data device comprises a mobile device, configured to:
query and receive return signals from a plurality of security devices within a broadcast range of the mobile device; and
generate a security sweep indication based on the return signals.

11. The system of claim 1, further comprising
a plurality of antennae, electrically connected to the data device, each antenna disposed in a fixed location with respect to a plurality of the security devices and configured to send and receive signals with at least a subset of the plurality of security devices; and
wherein the data device is positionable in a fixed location with respect to the antennae, and is configured to provide information regarding a condition of all of the plurality of security devices.

12. The system of claim 1, wherein the data device is further configured to display the graphical indication of the secured status, the graphical indication of the compromised status, and the graphical indication of the no signal status superimposed on a plan view diagram of an aircraft.

13. A radio frequency identification (RFID) device, comprising:
a first portion and a second portion, coupled at a separation region that is configured to be disposed across a separation boundary of a separable object;
a first RFID circuit, configured to transmit a first signal to an RFID reader, having a first processor disposed entirely on the first portion and a first antenna extending across the separation region separation of the first processor and first antenna preventing transmission of the first signal; and
a second RFID circuit, configured to transmit a second signal to the RFID reader, having a second processor disposed entirely on the second portion and a second antenna disposed entirely on the second portion;
wherein transmission of the first signal with the second signal causes the RFID reader to display a graphical indication of a secured status, wherein transmission of the second signal without the first signal causes the RFID reader to display a graphical indication of a tampered status, and wherein transmission of neither the first signal nor the second signal causes the RFID reader to display a graphical indication of a no signal status.

14. The RFID device of claim 13, wherein the first and second portions comprise opposing portions of a single-use adhesive strip, the first RFID circuit being embedded in a substrate of the strip, the separation region comprising a breakable portion of the strip.

15. The RFID device of claim 13, wherein the separation region comprises a selectively breakable electrical connection between the processor and antenna.

16. The RFID device of claim 15, wherein the selectively breakable electrical connection comprises a non-contact electromagnetic proximity connection across the separation region.

17. A method for facilitating inspection of a plurality of sealed objects, comprising:
placing a first processor of a first Radio Frequency Identification (RFID) device on a first side of a separation boundary;
placing a first antenna of the first RIFD device across a separation boundary of a sealed object;
placing a second processor of a second RFID device on a second side of the separation boundary;
placing a second antenna of the second RFID device entirely on the second side of the separation boundary;
configuring a data device to scan and receive a return signal from the first RFID device and from the second RFID device that indicates a tampered condition of the sealed object; and
providing, via the data device, an output via a graphical user interface that associates the tampered condition with one of three statuses, the three statuses including a secured indication, a no signal indication, and a compromised indication.

18. The method of claim 17, wherein placing the first RFID device further comprises placing an RFID device having a passive RFID circuit, and wherein configuring the data device further comprises configuring a mobile computing device to scan and receive the return signal from the first RFID device when within a transmission radius.

19. The method of claim 17, wherein configuring the data device further comprises:
providing a computing device at a fixed location; and
coupling the data device to a fixed-location radio antennae configured to send and receive signals with the first RFID device.

20. The method of claim 17, wherein configuring the data device further comprises programming the data device to be reset within a predetermined time interval of resetting the first RFID device after a tampered condition signal has been received.

* * * * *